US012784047B2

(12) United States Patent
Kylänpää et al.

(10) Patent No.: US 12,784,047 B2
(45) Date of Patent: Nov. 3, 2026

(54) DECENTRALIZED PEER-TO-PEER PRIVACY-PRESERVING BILLING

(71) Applicant: Adeia Guides Inc., San Jose, CA (US)

(72) Inventors: Markku Kylänpää, Helsinki (FI); Ville Ollikainen, Vihti (FI); Pekka Koskela, Oulu (FI); Anni Karinsalo, Oulu (FI)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 18/240,728

(22) Filed: Aug. 31, 2023

(65) Prior Publication Data

US 2025/0078076 A1 Mar. 6, 2025

(51) Int. Cl.
*G06Q 20/40* (2012.01)
*G06Q 20/14* (2012.01)
*G06Q 20/38* (2012.01)

(52) U.S. Cl.
CPC ......... *G06Q 20/4014* (2013.01); *G06Q 20/14* (2013.01); *G06Q 20/3825* (2013.01); *G06Q 20/3829* (2013.01); *G06Q 2220/00* (2013.01)

(58) Field of Classification Search
CPC ............... G06Q 20/4014; G06Q 20/14; G06Q 20/3825; G06Q 20/3829; G06Q 2220/00
See application file for complete search history.

(56) References Cited

U.S. PATENT DOCUMENTS 7,853,529 B1 * 12/2010 Walker .................. G06Q 20/10 705/55
8,548,868 B1 * 10/2013 Lawrence .......... G06Q 30/0605 705/26.4

(Continued)

FOREIGN PATENT DOCUMENTS

GB 2622359 A 3/2024
WO 2018125234 A1 7/2018

(Continued)

OTHER PUBLICATIONS

"3-D Secure," Wikipedia, [retrieved from URL: https://en.wikipedia.org/wiki/3-D_Secure on Nov. 9, 2023] 7 pages.

(Continued)

*Primary Examiner* — Patrick Mcatee
*Assistant Examiner* — Vincent I Idiake
(74) *Attorney, Agent, or Firm* — HG LAW LLP

(57) ABSTRACT

A privacy-preserving process for communicating over a decentralized peer-to-peer network is described in which a user device receives a digitally signed temporary user ID from an identification service, and initiates a transaction with an online content provider using the digitally signed temporary user ID and cryptographically encrypted user payment information. The user device receives data from the content distributor in response to the content distributor receiving a first indication of payment for the transaction from a payment service. In this method, the first indication of payment for the transaction to the content distributor was to have been transmitted by the payment service device in response to: the payment service device receiving the temporary user ID and linking the temporary user ID to the user information; and the payment service receiving a second indication of payment based on the user information.

20 Claims, 11 Drawing Sheets

(56) References Cited

U.S. PATENT DOCUMENTS

| | | | | |
|---|---|---|---|---|
| 11,935,040 | B1 | 3/2024 | Dahn et al. | |
| 2008/0154782 | A1 | 6/2008 | Kang et al. | |
| 2015/0019443 | A1* | 1/2015 | Sheets | G06Q 20/3829 705/71 |
| 2015/0052064 | A1* | 2/2015 | Karpenko | G06Q 20/3227 705/71 |
| 2017/0091765 | A1* | 3/2017 | Lloyd | G06Q 20/321 |
| 2023/0097712 | A1 | 3/2023 | Sullivan et al. | |
| 2025/0005552 | A1 | 1/2025 | Ollikainen et al. | |
| 2025/0005568 | A1 | 1/2025 | Michaella | |
| 2025/0086620 | A1 | 3/2025 | Kylänpääet al. | |
| 2026/0105432 | A1 | 4/2026 | Ollikainen et al. | |

FOREIGN PATENT DOCUMENTS

| | | | |
|---|---|---|---|
| WO | 2022118263 | A1 | 6/2022 |
| WO | 2024/052047 | A1 | 3/2024 |

OTHER PUBLICATIONS

"AppleCash," [retrieved from URL: https://www.apple.com/apple-cash/ on Nov. 9, 2023] 9 pages.

"CashApp," [retrieved from URL: https://cash.app/ on Nov. 9, 2023] 1 page.

"Complete Guide to GDPR compliance," [retrieved from URL: https://gdpr.eu/ on Nov. 9, 2023] 4 pages.

"Compulsive gamibing," Mayo Clinic, [retrieved from URL: https://www.mayoclinic.org/diseases-conditions/compulsive-gambling/symptoms-causes/syc-20355178 on Nov. 9, 2023] 10 pages.

"David Chaum," Wikipedia, [retrieved from URL: https://en.wikipedia.org/wiki/David_Chaum on Nov. 9, 2023] 9 pages.

"Ecash," Wikipedia, [retrieved from URL: https://en.wikipedia.org/wiki/Ecash on Nov. 9, 2023] 4 pages.

"Legislation helps to prevent gambling-related harm," Ministry of the Interior Finland, [retrieved from URL: https://intermin.fi/en/police/gambling on Nov. 9, 2023] 3 pages.

"PayGoogle—a better way to pay, by Google Pay Home page," [retrieved from URL: https://pay.google.com/ on Nov. 9, 2023] 1 page.

"Payment Services Directive 2 (PSD2): Directive 2015/2366/EU (PSD2)," [retrieved from URL: https://www.eba.europa.eu/regulation-and-policy/single-rulebook/interactive-single-rulebook/5402 on Nov. 9, 2023] 8 pages (2015).

"Paypal," [retrieved from URL: https://paypal.com/ on Nov. 9, 2023] 7 pages.

"Paysafecard," Wikipedia, [retrieved from URL: https://en.wikipedia.org/wiki/Paysafecard on Nov. 9, 2023] 11 pages.

"Secure Electronic Translation," Wikipedia, [retrieved from URL: https://en.wikipedia.org/wiki/Secure_Electronic_Transaction on Nov. 9, 2023] 3 pages.

"SET Secure Electronic Transaction Specification, Book 2: Programmer's Guide," [retrieved from URL: https://www.maithean.com/docs/set_bk2.pdf] 629 pages (1997).

"SET Secure Electronic Transaction Specification, Book 3: Formal Protocol Definition," [retrieved from URL: https://www.maithean.com/docs/set_bk3.pdf] 262 pages (1997).

"SET Secure Electronic Translation Specification: Book 1: Business Description," [retrieved from URL: https://www.maithean.com/docs/set_bk1.pdf] 80 pages (1997).

"Tornado Cash," Wikipedia, [retrieved from URL: https://en.wikipedia.org/wiki/Tornado_Cash on Nov. 9, 2023] 4 pages.

"U.S. Treasury Sanctions Notorious Virtual Currency Mixer Tornado Cash," [retrieve from URL: https://home.treasury.gov/news/press-releases/jy0916] 4 pages (2022).

"Venmo—Fast, safe, social payments," [retrieved from https://venmo.com on Nov. 9, 2023], 18 pages.

Ali, S. T., et al., "The Nuts and Bolts of Micropayments: a Survey," [retrieved from URL: https://arxiv.org/abs/1710.02964], 19 pages (2017).

"DSAlliance Decentralized Storage Alliance, Enterprise Storage Alliance for the Decentralized Web,," [retrieve from URL: https://dsalliance.io/], 5 pages (2023).

"Filecoin: A Cryptocurrency Operated File Storage Network," [retrieved from URL: https://filecoin.io/filecoin-jul-2014.pdf], 8 pages (2014).

"Filecoin: A Decentralized Storage Network. Protocol Labs," [retrieved from URL: https://filecoin.io/filecoin.pdf], 36 pages (2017).

"Reiden Overview," [retrieved from URL: https://raiden.network/faq.html] 1 page (2023).

"Security protocol notation," Wikipedia, 2 pages (2023).

"Storj: A Decentralized Cloud Storage Network Framework,"[retrieved from URL: https://www.storj.io/storjv3.pdf], (2018).

Project Xanadu, Wikipedia article, [retrieved from URL: https://en.wikipedia.org/wiki/Project_Xanadu], 1-5 (2023).

Bano, S., et al., "Consensus in the Age of Blockchains,", University College London [retrieved from URL: https://doi.org/10.48550/arXiv.1711.03936], 17 pages (2017).

Bennet, B., et al., "Overlap Between the GDPR and PSD2," Inside Privacy, 6 pages (2018).

Bernardi, S., "The analysis Filecoin doesn't want you to read," [retrieved from URL: https://tokeneconomy.co/the-analysis-filecoin-doesnt-want-you-to-read-e60d5243f17c] 15 pages (2017).

Catalano, D., et al., "A Fair Micro-Payment Scheme for Profit Sharing in P2P Networks," 2004 International Workshop on Hot Topics in Peer-to-Peer Systems, 8 pages (2004).

Chaudhary, K., et al., "P2p-netpay: an off-line micro-payment system for content sharing in p2p-networks," Journal of Emerging Technologies in Web Intelligence, 1(1): 46-54 (2009).

Chiesa, A., et al., "Decentralized Anonymous Micropayments," International Conference on the Theory and Application of Cryptographic Techniques, 72 pages (2017).

Chothia, T., "Secure Communication, Computer Security, Lecture 8," University of Birmingham, 31 pages (2012).

Cohen, B., "Incentives Build Robustness in BitTorrent," [retrieved from URL: https://www.bittorrent.org/bittorrentecon.pdf], 5 pages (2003).

Edge, J., "Tornado Cash and collateral damage," [retrieved from ULR: https://lwn.net/Articles/904960/] 51 pages (2022).

Foo, E., et al., "A payment scheme using vouchers," Financial Cryptography. Lecture Notes in Computer Science, 465:103-121(1998).

Frankendfield, J., "Micropayments: What it is, How it Works in Fintech," [retrieved from URL: https://www.investopedia.com/terms/m/micropayment.asp], 5 pages (2021).

Gabber, E., et al., "Agora: A minimal distributed protocol for electronic commerce," The Second USENIX Workshop on Electronic Commerce Proceedings, 223-232 (1996).

Garcia, F.D., et al., "Off-line karma: A decentralized currency for peer-to-peer and grid applications," Applied Cryptography and Network Security: Third International Conference, Proceedings 3:364-377 (2005).

Glassman, S., et al., "The Millicent Protocol for Inexpensive Electronic Commerce," The 4th World Wide Web Conference, 16 pages (1995).

Herzberg, A., et al., "Minipay: charging per click on the web," Computer Networks and ISDN Systems, 29(8):939-951 (1997).

Hornle, J., et al., "Evaluation of regulatory tools for enforcing online gambling rules and channelling demand towards controlled offers," European Commission, Directorate-General for Internal Market, Industry, Entrepreneurship and SME, 167 pages (2018).

Jain M., et al., "Peer2peer (p2p) micropayments: A survey and critical analysis," DA-IICT, Gandhinagar, 9 pages (2008).

Lakhani, V. H., et al., "Fair Incentivization of Bandwidth Sharing in Decentralized Storage Networks," 2022 IEEE 42nd International Conference on Distributed Computing Systems Workshops (ICDCSW), 39-44 (2022).

Lind, J., et al., "Teechain: a secure payment network with asynchronous blockchain access," Proceedings of the 27th ACM Symposium on Operating Systems Principles, 63-79. (2019).

Long, J., et al., "Off-Chain Micropayment Pool for High-Throughput Bandwidth Sharing Rewards," 2021 IEEE International Conference on Blockchain and Cryptocurrency (ICBC), 1-6, (2021).

(56) References Cited

OTHER PUBLICATIONS

Madhusudan, A., et al. "Nirvana: Instant and Anonymous Payment-Guarantees." Cryptology ePrint Archive, 46 pages (2022).
Mavroudis, V., et al., "Snappy: Fast on-chain payments with practical collaterals," arXiv preprint arXiv:2001.01278, 18 pages (2020).
Mikalauskas, E., "The ultimate guide to safe and anonymous online payment methods in 2023," CyberNews, 21 pages (2022).
Morillo, P., et al., "Weighted threshold secret sharing schemes," Information Processing Letters, 70:211-216 (1999).
Simmons, G.J., "An Introduction to Shared Secret and/or Shared Control Schemes and Their Application," Contemporary Cryptology: The Science of Information Integrity, IEEE, 441-497 (1992).
U.S. Appl. No. 18/216,642, filed Jun. 30, 2023, Ville Ollikainen.
U.S. Appl. No. 18/244,721, filed Sep. 11, 2023, Markku Kylänpää.
MvVitie, S., "Ubuntu package libgfshare git repository," [retrieved from URL: https://salsa.debian.org/debian/libgfshare on Nov. 9, 2023] 3 pages.
Poon, J., et al., "The Bitcoin Lightning Network: Scalable Off-Chain Instant Payments," J version 0.5.9.2, 1-59 (2016).
Poutanen, T., et al., "NetCents: A Lightweight Protocol for Secure Micropayments," USENIX Workshop on Electronic Commerce, 25-36 (1998).
Rivest, R.L., "Peppercoin Micropayments," Peppercoin micropayments. In International Conference on Financial Cryptography, 1-8 (2004).
Rivest, R.L., et al., "PayWord and MicroMint: Two simple micropayment schemes," International workshop on security protocols, 69-87 (1996).
Rusell, A., "Micro-betting: a dangerous form of gambling luring in vulnerable Australians," The Conversation, 4 pages (2018).
Sarkar, A., "How to keep your cryptocurrency safe after the FTX collapse,", Coin Telegraph, [retrieved from URL: https://cointelegraph.com/news/how-to-keep-your-cryptocurrency-safe-after-the-ftx-collapse], 14 pages (2022).
Shamir, A., "How to share a secret," Commun. ACM 22, 11: 612-613 (1979).
Sirbu, M.S., et al., "NetBill: An internet commerce system optimized for network-delivered services," IEEE Personal Communications, 2(4):34-39 (1995).
Stallings, W., "The SET Standard & E-Commerce," [retrieved from URL: https://www.drdobbs.com/the-set-standard-e-commerce/184404309] 4 pages (2000).
Tang, L., et al., "A tool for micropayments on the World Wide Web," 6th USENIX Security Symposium, 1-8 (1996).
Vishnumurthy, V., et al., "KARMA : A Secure Economic Framework for Peer-to-Peer Resource Sharing," Department of Computer Science, Cornell University, 1-6 (2003).
Wagemann, C., "What Is a Micropayment?," The Balance, [retrieved from URL: https://www.thebalancemoney.com/micropayment-5205583], 1-6 (2021).
Wei, K., et al., "WhoPay: A Scalable and Anonymous Payment System for Peer-to-Peer Environments," 26th IEEE International Conference on Distributed Computing Systems (ICDCS'06), 10 pages (2006).
Yang, B., et al., "PPay: micropayments for peer-to-peer systems," Proceedings of the 10th ACM conference on Computer and communications security (CCS '03), Association for Computing Machinery, 300-310 (2003).
Zuo, M., et al., "Constructing fair-exchange p2p file market," International Conference on Grid and Cooperative Computing, 941-946 (2005).
Antonopoulos, A. M., "Mastering Bitcoin," 405 pages (2017).
B. Schneier, "Applied cryptography, protocols, algorithms and source code in C," Applied Cryptography, pp. 139-147, 174 (1996).
B. Wtiscka, "BLIK. Where did the Polish mobile payment system come from and how does it work?", pp. 1-8, Dec. 3, 2022, XP093228277.
Carbunar, et al., "Conditional e-payments with transferability," Jr. of Parallel and Distributed Computing, 71(1): 16-26 (2011).
Catalano et al. "A Fair Micro-Payment Scheme for Profit Sharing in P2P Networks", 2004 International Workshop on Hot Topics in Peer-to-Peer Systems, 8 pages (Year: 2004).

* cited by examiner

MSG01 (SOTI_Req) :
U -> IS: {auth-info, invoice-address, pk($U_{eph}$) },

MSG02 (SOTI_Reply) :
IS ->U : { SOTI, SIGNED_EPH, SIGNED_ADDR }

SOTI = Signed { OTI } sk (IS)
SIGNED_EPH = Signed { pk ( $U_{eph}$ ) } sk ( IS )
SIGNED_ADDR = Signed { invoice-address } sk ( IS )

MSG03 (License_Req) :
U - >CD : {ContentID, SIGNED_EPH, ENCRYPTED_ADDR, SOTI }

SIGNED_EPH = Singed { pk ($U_{eph}$) } sk ( IS )
ENCRYPTED_ADDR = { SIGNED_ADDR } pk (PS) = { Signed { invoice-address } sk ( IS ) } pk (PS)
SOTI = Signed { OTI } sk ( IS )

MSG04 ( Key_Req ) :
CD->CS : { ContentID, SIGNED_EPH}

SIGNED_EPH = Signed { pk ($U_{eph}$) } sk (IS)

MSG05 ( Key_Reply ) :
CS->CD : { lIcenseID, SIGNED_ENCRYPTED_CEK}

SIGNED_ENCRYPTED_CEK} = Signed { { CEK } pk ( $U_{eph}$ ) } sk ( CS )

MSG06 ( Invoice_Req ) :
CD->PS : { Amount, License ID, SIGNED_EPH, ENCRYPTED_ADDR }

SIGNED_EPH = Signed { pk ($U_{eph}$) } sk (IS)
ENCRYPTED_ADDR = { SIGNED_ADDR } pk (PS) = { Signed { invoice-address } sk ( IS ) } pk (PS)

MSG7 (License_Reply ) :
CD->U : {Signed { LicenseID, VERIFICATION_MESSAGE, SIGNED_ENCRYPTED_CEK }

VERIFICATION_MESSAGE = SOGNED {SOTI, #LicenseID, ContentDistributorID } sk ( CD )
where SOTI = Signed { OTI } sk ( IS )
SIGNED_ENCRYPTED_CEK = Signed { { CEK } pk (Ueph) } sk (US)

MSG8 (Invoice_Reply ) :
PS->U : { Amount, LicenseID } sk ( PS )

FIG. 8

FIG. 10

| | U | IS | CD | CS | PS |
|---|---|---|---|---|---|
| Identity | X | X | | | |
| ContentID | X | | X | X | |
| LicenseID | X | | X | X | X |
| Payment | X | | | | X |
| Invoice | X | | | | X |
| CEK | X | | | X | |

DECENTRALIZED PEER-TO-PEER PRIVACY-PRESERVING BILLING

BACKGROUND

The present disclosure relates to the field of online user privacy and, in particular, to preserving the privacy of user profiles in distributing content over decentralized peer-to-peer networks.

A technological problem that arises with online or internet communications or transactions, such as involved in online content consumption, is that a "digital footprint" or a "digital shadow" of online activities may be left as a user device, such as via a browser or an application, visits a website, requests content, and otherwise performs communications on the Internet. Unlike in a brick-and-mortar environment, online transactions may reveal aspects of user's data and may reveal portions of a user profile, such as a content consumption history and payment information.

Online privacy is a type of personal privacy concerning the storing, re-purposing, provision to third-parties, and displaying of information via the Internet. Maintaining online privacy may entail protection of either personally identifiable information (PII) or non-PII information, such as a site visitor's behavior on a website provided by a server or group of servers. PII generally refers to any information that can be used to identify an individual.

Online business entities typically attempt to collect as much data as possible from online visitors. Repeated visits by a browser to a server that provides digital content or provides another type of web-based service may leave behind data sufficient to piece together a pattern of data that reveals aspects of a user's profile, resulting in a loss of data privacy. In a peer-to-peer (P2P) framework, or decentralized network provider/distributor environment, it may be unclear from whose server on the Internet the user's device is requesting services or interacting with. This may leave a user's device subject to attacks and exploits from unscrupulous Internet actors. Such online privacy concerns may also deter Internet activity, and may result in a failure to access resources, such as needed or requested goods or services, including digital content.

According to one approach to protecting online privacy, proxies are added to handle license acquisition for digital content, a Virtual Private Network (VPN) may be used to access online resources, or other encryption approaches ("onion routing") may be used to hide user's media access. However, the user's device may be linked to transactions conducted, to media content consumed, or to visits to a server in the past, which may then be used to classify the user, to create a profile for the user, to send spam, and/or to learn the user's identity. Also, upon purchase of media content, the provider may, as part of the payment and/or billing process, link the identity of the user to the transaction. For example, the credit card, checking account number, or other bank information may be used to learn the user's data.

SUMMARY

According to an embodiment, online transaction data that links a user profile to a service provided by a network server is not revealed or is otherwise obscured. Such transaction data is effectively kept private so that no single participant in the transaction may be able to link a particular transaction to prior transactions using a payment or transaction history. A first device (sometimes referred to as "the UD" or user device but may be any device that provides such functions) obtains a temporary ID from a second device, which may be a server of an Identification Service ("IS") entity or node, or may be any other device that performs such functions. The temporary ID is used for a transaction with a third device, which may be a server of a content distributor ("CD"), such as an online merchant or content provider, for example, but may be any device that performs such functions. In an embodiment, a new temporary ID may be obtained from the IS and may be used for only one transaction. The first device may transmit to the third device a cryptographically encrypted message containing payment information that is not decipherable by the third device. In an example, the cryptographically encrypted message may be a message encrypted with a public key of a fourth device, which may be a server of a Payment Service ("PS"), such as a bank or credit card company or another entity that provides similar functions.

According to an embodiment, the third device transmits the cryptographically encrypted message (or one or more portions thereof) to the fourth device. The fourth device (e.g., the PS) is able to decrypt the payment information, pay for the transaction, and transmit an invoice to the first device. Or, payment by the fourth device to the third device may occur after the fourth device receives indication of payment from the first device. The first device transmits payment to the fourth device, which may then transmit payment to the third device. The third device thereafter, or before receiving an indication of payment from the fourth device, may send the content data or provide another service to the first device.

This embodiment may provide a mechanism for secure payment to the third device, and provide evidence that can be used in billing and for tracing payment for a transaction, as may be required by law, while preserving user anonymity. There may be a need or legal requirement to implement interception by law enforcement agencies or tax or other authorities to trace financial transactions. Authorities often require traceability of financial transactions to prevent money laundering and other criminal transactions. This is a critical issue as governments have started to prevent operations of technologies that have been used in money laundering. This is the often at odds with technology for increased online confidentiality of financial transactions. For example, the European Union (EU) has a directive for payment services (PSD2) but it does not fully address online user confidentiality. In fact, the PSD2 directive has been understood as conflicting with the EU's General Data Protection Regulation (GDPR), which provides for online privacy of users. According to an aspect of the disclosure such concerns and others may be addressed.

With the disclosed techniques, no specific form of payment is necessarily required between the UD and the CD. According to an embodiment, user profile data and the user's identity may be hidden from the CD, and the type of purchased or requested content items may be hidden from the PS. The IS may generate trusted pseudonyms that are different in each transaction, which helps to prevent the CD from profiling the user and linking together multiple purchases from the same user device. It will be appreciated that the user may use multiple devices, which may all sometimes be referred to as a "user device."

Described are a method, system, apparatus, non-transitory computer-readable medium, means for performing the method for providing a billing privacy preserving process. Such a method may include: receiving, by a UD associated with user information, a temporary user ID from an IS initiating, by the UD, a transaction with a CD using the temporary user ID. The UD may receive data from the CD, wherein the data is sent by the CD in response to receiving a first indication of payment for the transaction from a PS. In this method, the first indication of payment for the transaction to the CD was to have been transmitted by the PS device in response to: the PS device receiving the temporary user ID and linking the temporary user ID to the user information; and the PS receiving a second indication of payment based on the user information.

Such a method may also include receiving, by the UD, payment information for the transaction from the PS device based on the user information being linked, by the PS device, to the temporary user ID.

In addition, according to this method may also include receiving, by the UD, user payment information signed by the IS, and then encoding, by the UD using a public key of the PS, the signed user payment information. The UD may transmit to the CD the signed user payment information as encoded by the UD, such that the temporary user ID is linked, by the PS device, to the temporary user ID based on the signed user payment information as encoded by the UD that is received by the PS device from the CD In such a method, the user payment information received by the UD is signed using a private key of the IS By way of further example, the user payment information, which may be signed by the IS, is encoded by the UD using a public key of the PS.

According to a further aspect of the disclosure, the method may include receiving, by a UD from an IS, a temporary user ID that is signed by the IS and user payment information that is signed by the IS. The UD, using a public key of a PS, may encrypt the user payment information signed by the IS-. Then the UD may initiate a transaction with a CD using the temporary user ID. The UD may at this time, or following receipt of indication of payment by the CD receive the requested data from the CD, wherein the requested data is sent by the merchant device in response to receiving a first indication of payment for the transaction from a PS. According to this approach, the first indication of payment for the transaction may be transmitted by the PS to the CD in response to: the PS receiving the temporary user ID and linking the temporary user ID to the user information based on the user payment information signed by the IS as encrypted by the UD; and the PS receiving a second indication of payment based on the user information.

In such a method, as part of the initiating of the transaction with the merchant device, the UD may transmit to the CD the user payment information signed by the IS, and which is further encrypted by the UD.

According to such a method, the UD may receive, from the IS, a user public key signed by the IS. The UD may initiate the transaction to the CD by transmitting the user public key signed by the IS. The UD may receive, as the requested data, a media content item encoded by the user public key and/or a media content item encoded by the user public key.

Such an approach may provide technological solutions to technological problems highlighted by online transactions: the identity, or aspects of the identity, of a user may be kept confidential from a vendor even in repeated visits of the user to the vendor.

BRIEF DESCRIPTION OF THE DRAWINGS

The above-described features and other features of the present disclosure, its nature and various advantages will be more apparent upon consideration of the following detailed description, taken in conjunction with the accompanying drawings, and in which:

FIG. 8 is an example of a messaging that may be transmitted between actors of the transaction, according to an aspect of the disclosure;

FIG. 10 is a table showing which actors have, and which actors are denied, various pieces of information, according to an aspect of the disclosure.

DETAILED DESCRIPTION

Figure 1:
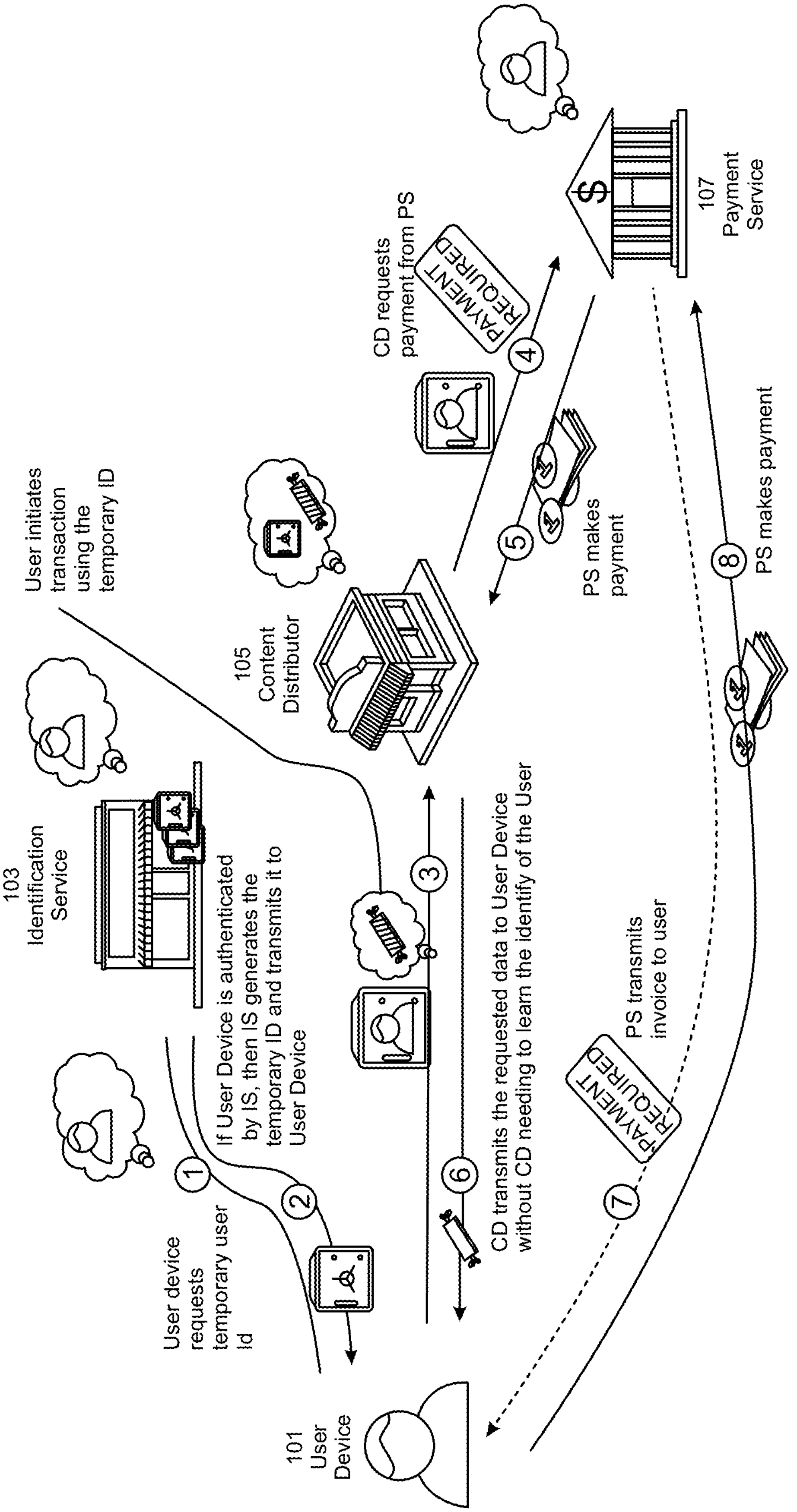
FIG. 1 illustrates an example of an online transaction in which an Identification Service provides the UD device with a temporary user ID to prevent the merchant/vendor/content distributor (CD) from profiling the UD device, according to an aspect of an embodiment of the disclosure.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood that the embodiments and examples described herein may be practiced without these specific details. In other instances, well-known methods, procedures and components, including software, firmware and hardware components, have not been described in detail so as not to obscure the embodiments described herein. Also, the description is not to be considered as limiting the scope of the embodiments described herein.

Aspects of an illustrative embodiment of the disclosure will now be described with reference to the example shown in FIG. 1.

In some embodiments, the UD 101 may initiate a process for a privacy-preserving transaction with the CD 105 by first contacting the IS 103. Thus, in a first communication 1, UD 101 sends a request to a server of Identification Service (or IS) 103 to request creation of a temporary ID (e.g., a Signed One-Time Identifier (SOTI)) that is used to create a trusted pseudonym identity for the UD 101. The first communication 1 may also include payment information (sometimes hereinafter described as an "invoice address") for the UD 101. The payment information may be bank account information, credit card information, and/or other payment account information for the user, or may be a single-purpose user account number provided by the PS and sufficient for the PS to associate the user with an actual bank account/debit card/credit card number, or the like.

The IS 103 may verify the UD 101 profile data or an identity of a person associated with the UD 101, for example, using a username and password, two-stage identification, or other means. Once verified, the IS 103 sends a second communication 2 to the UD 101, which returns the SOTI that is digitally signed by the IS 103. The IS 103 may also transmit, in this example to the UD 101, payment information that is digitally signed by the IS 103. The IS 103 may provide the temporary ID to UD 101 digitally signed using a digital signature of the IS 103. This digitally signed temporary ID from a trusted IS 103 helps to provide assurance to the CD 105 that the temporary ID of the UD 101 is legitimate and that it has not been modified. The digital signature of the IS 103 may, for example, be created using a private key of the IS 103. Using a known public key of the IS 103, the temporary user ID may then be ascertained by recipients of the digitally signed temporary user ID. In an embodiment, instead or in addition, the IS 103 may transmit the payment information and the SOTI to the PS 107.

To initiate a transaction, the UD 101 sends a communication 3 to the CD 105. Example transactions may include the purchase of a product, a request for media content from the CD 105, subscribing for a service or for media content or other data, requesting information, downloading or accessing software (including software as service), requesting access to a web resource, or to other data, requesting or obtaining a license for digital rights, and/or requesting or initiating some other action by a server associated with the CD 105. In communication 3, the UD 101 initiates a transaction (e.g., to purchase of a product) by sending a request including the SOTI to the server of CD 105. In an example, the UD 101 may use cryptological means, such as the public key of the PS, to encrypt the payment information. For example, the UD 101 may encrypt, using a public key of the PS 107, the payment information that had been digitally signed with the private key of the IS 103. The UD 101 may then transmit the encrypted payment information to the CD 105 as part of, or in addition, to communication 3.

Generally, messages between the actors/nodes may use a secure channel, which may be, for example, a Transport Layer Security (TLS) connection. According to an aspect of the disclosure, a program or application residing on or at the UD 101 may automatically handle the commencing of such a process with the IS server, and then initiate the transaction with the CD 105 in a manner that is transparent to the UD 101. The UD and other nodes may use software running in an isolated Trusted Execution Environment (TEE) for communication, encryption, decryption, and/or other processes of the transaction. According to an embodiment, the CD 105 need not be informed and may never learn the real identity of the UD 101. The CD 105 and/or other nodes may use trusted public keys from a trusted PKI certificate authority. CD 105 may be a device of a peer or other user that is not in the business of providing goods, services or other types of products, content or other data, to consumers.

Figure 7:
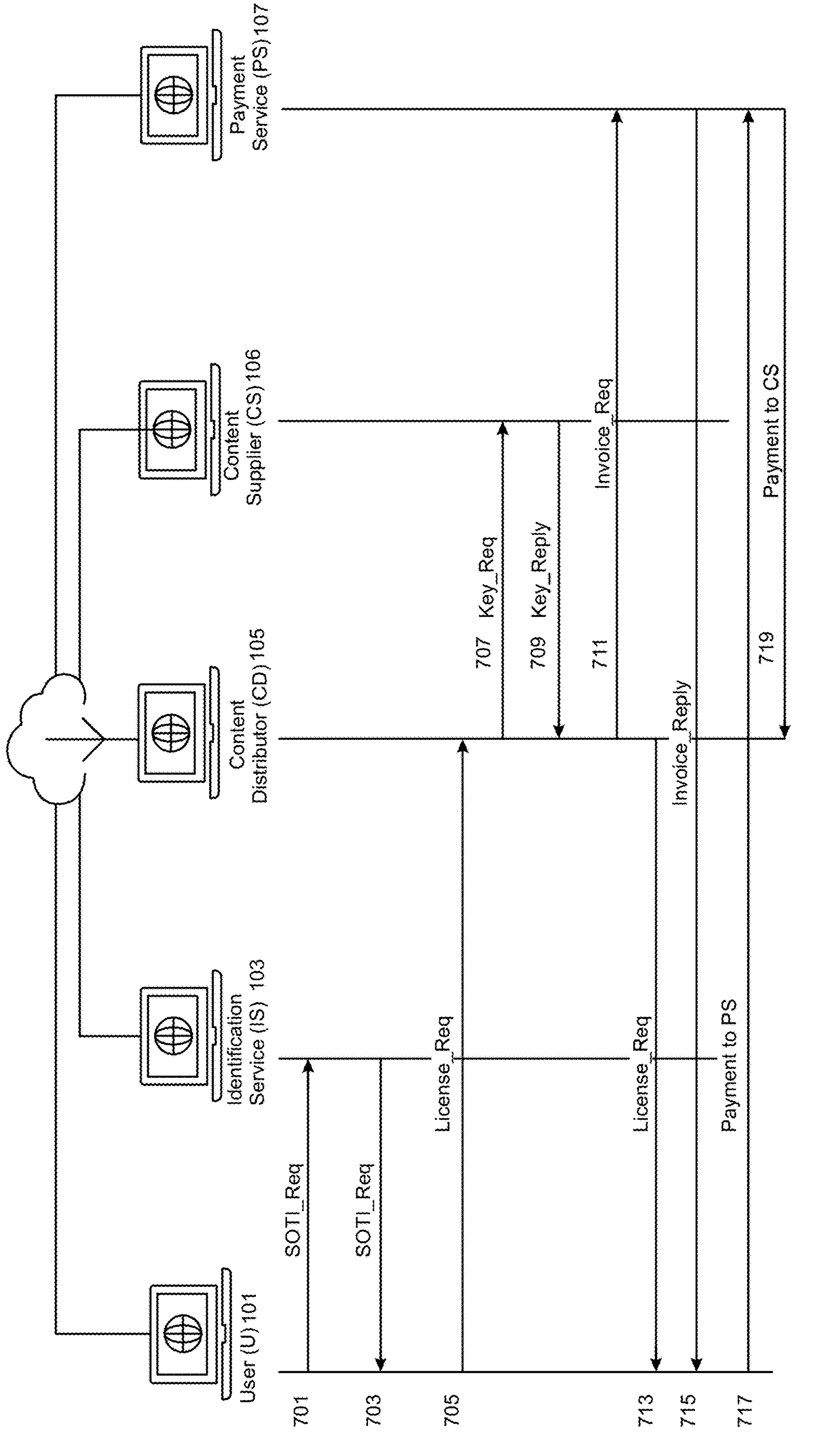
FIG. 7 a communication flow diagram between actors of an online billing privacy-preserving transaction, according to an aspect of the disclosure.

Referring further to the embodiment of FIG. 7, the CD 105 may obtain content from a content supplier (CS) 106, which may be a media or content producing company or other such entity, may provide media content data or other content data, including programming content according to a schedule, such as television or cable programming, and non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider Internet content may include web events, such as a chat session or Webcast, or content available on-demand as streaming content or downloadable content through an Internet web site or other Internet access (e.g. FTP). Or, the CD may be the source for such media or other content or other services or products.

Referring back to FIG. 1, in response to the initiation of the transaction, in communication 4 the CD 105 transmits to the PS 107 a payment request and the encrypted payment information bound to the trusted pseudonym identity provided by the UD 101. In an embodiment, the PS 107 may receive, from the CD 105, the payment information digitally signed by the IS 103 (for example, signed with the private key of the IS) as further encrypted (for example, encrypted by the UD 101 using the public key of PS 107). Or, the PS 107 may receive the payment information in some other way, for example, directly from the UD 101. Then, the PS 107 may use the private key of the PS 107 to decrypt the payment information to ascertain the digital signature of the IS 103. In this way, the PS 107 may verify that the trusted pseudonym is certified by the IS 103, and that the payment information matches the real account of a known user associated with the UD 101. The known user may have an account with the PS 107 or an account known by the PS 107. The PS 107 may also do other checks (e.g., check credit limit or account balance of the UD 101, check a maximum transaction amount, transmit a request to the UD 101 to verify the transaction etc.).

If verification is successful, the PS 107 may transfer money, funds, or other form of compensation to the CD 105 via communication 5. In an embodiment, the funds need not be actually transferred to the CD 105 at this time, but CD 105 may receive some other indication from PS 107 that payment has been authorized, or that payment will take place at some point in the future. For example, PS 107 may be a credit card company or a bank issuing a notification to CD 105 that the credit card transaction has been authorized, that the funds are present in the bank account of the UD 101 and will be debited, that a wire transfer (or Zelle, Venmo, Paypal, etc. payment) has been acknowledged, approved, verified, processed, transacted or completed, that a check has been written, or the like. According to an embodiment, the PS 107 is not provided with information regarding what the UD 101 has bought or what the target of the transaction is. In an embodiment, an assurance by PS 107 to CD 105 that payment will take place in the future may be an indication of payment that is sufficient for CD 105 to furnish the data or other service to the UD 101. The payment or other indication of payment by the PS 107 to the CD 105 may be provided before or after the PS 107 receives payment or indication of payment from the UD 101 or substantially contemporaneously with the PS 107 receiving payment or indication of payment from the UD 101.

In communication 6, the CD 105 transmits content data or other data that was a target of the transaction to the UD 101, or transmits a report confirming that the transaction has been completed or is soon to be completed, the product has been shipped, processed, ordered, flagged for processing, etc., or transmits a confirmation that the content data or other data will be transmitted, downloaded, processed, ordered or flagged for transmission, or that the UD 101 is subscribed or enrolled, accepted, or otherwise confirming completion of the transaction.

In a digital rights management (DRM) use case, the CD 105 may request content data from the content supplier (CS) 106 (shown in FIG. 7), and the CD 105 may receive and pass an encrypted media content encryption key to the UD 101 in fulfillment of the transaction.

In such a case involving a CS 106, the CD 105 may request payment from the PS 107 following the receipt of the data from CS 106 or before the receipt of the data from CS 106. The PS 107 may use the payment information digitally signed by the IS 103, as encrypted by the UD 101 using cryptographic credentials known to the PS 107, and may use the temporary ID (the SOTI) of the UD 101 digitally signed by the IS 103, to provide payment the CD 105. The CD 105 may also transmit the amount to be paid, and may also transmit the payment information for the CD 105, such as payee checking account number, bank account information, Venmo/Zelle/Paypal information or the like, In an embodiment, the CD 105 may also transmit identifying information regarding the transaction, such as the date/time at which the transaction was requested by the UD 101 and/or the date/time at which the product/content (transaction target data) was delivered to the UD 101 or is to be delivered to the UD 101. According to an embodiment, the CD 105 may also notify the PS 107 of a description of the type of the transaction target data, such as the name/title/quantity of the transaction target data, and the like. In an embodiment, the PS 107 is not informed of the actual product, content data, or other service rendered by the server of the CD 105 that is the target of the transaction.

Upon receipt of the payment information in encrypted form, the PS 107 may decrypt the payment information and may then provide or authorize payment to the CD. The digital signature of the IS 103 on the temporary user ID may provide some assurance to the PS 107 that the UD 101 is an actual, verified user. The IS 103 may be a company whose reputation serves to assure that it has authenticated the UD 101 to which it provides a temporary ID and/or that it has received adequate payment/account information for payment from the PS 107 for the UD 101 or user profiled associated therewith. Similarly, the digital signature of the IS 103 on the payment information of the UD 101 may provide some assurance to the PS 107 that the transaction was initiated at the request of the UD 101, and thus may provide a measure of protection against an unscrupulous CD 105.

The payment information for the UD 101 allows the PS 107 to correlate the transaction with an actual identity of the UD 101. This may be of use for completion of the payment for the transaction to the CD 105 and for receiving payment by the PS 107 from the UD 101, for generating an invoice to the UD 101 so the UD 101 may document the transaction, and also may facilitate the PS 107 maintaining a record of the payment for the transaction for legal/law enforcement purposes. For example, the UD 101 may transmit the UD credit/debit card number and other credit/debit card information associated with UD 101, the UD checking account/bank account number information, Venmo/Zelle/Paypal information associated with UD 101, or the other methods and means herein discussed, or the like, or the UD may transmit someone else's payment information to be used for the transaction. The IS 103 may digitally sign the payment information and send it back to the UD 101.

According to an embodiment, the UD 101 may transmit the payment information as digitally signed by the IS 103, either encrypted or unencrypted, directly to the PS 107. In an embodiment the UD 101 may transmit an amount of the payment to be made, a date/time of the transaction, and the UD 101 may specify payee information such as, but not limited to, the account, address and/or other information of the CD who is to receive payment from the PS 107. Or, the IS 103 may transmit the payment information to PS 107, in which case, the digital signature of the IS 103 may or may not be provided for the payment information and, in which case, the payment information may be unencrypted.

In communication 7, the PS 107 may send an invoice to the UD 101 that it generates based on the payment information that PS 107 had received to find account information for the user associated with the UD 101. The PS 107 may have decrypted the payment information using the private key of the PS 107. In an embodiment, UD 101 may transmit the payment information to PS 107, and may also transmit to PS 107 the temporary user ID (SOTI) obtained from the IS 103. According to an embodiment, the payment information may be separately transmitted from the UD 101 to the PS 107, or from the IS 103 to the PS 107. According to an embodiment, the invoicing address information is encrypted if transmitted directly from the UD 101 to the PS 107, or from the IS 103 to the PS 107.

In communication 8, the UD 101 transfers money, funds, or other form of payment to the PS 107 according to the invoice. It will be understood that communications 7 and 8 may be transmitted prior to, or contemporaneously with, communication 5 providing payment or indication of payment to CD 105.

While described as payment, one or more of the payments in communications 5 and 8 may be a transmission authorizing, instructing and/or requesting payment, charging a credit or debit card, and/or may be a transmission authorizing, instructing and/or requesting a deduction of funds from an account of UD 101 with PS 107 or with another institution or individual, may be an indication of an instruction authorizing and/or requesting a wire transfer or other type of transfer of funds, moving a balance between account, writing a cheque, making a deposit, and/or may be a confirmation of the initiation, execution or completion of any of the foregoing. For example, communication 5 may comprise an assurance by the PS 107 to CD 105 that communication 7 invoicing UD 101 has been transmitted, that confirmation that communication 7 invoicing UD 101 has been received by UD 101, that communication 8 evidencing payment by UD 101 has been transmitted by UD 101, that communication 8 evidencing payment by UD 101 has been received by PS 107, or that an intermediary has received payment from UD 101 or has made payment to PS 107.

Figure 2B:
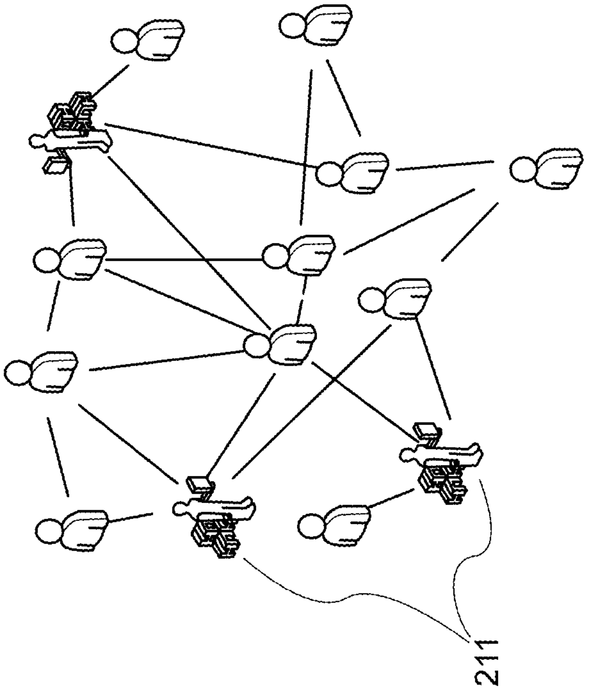
FIGS. 2A-2B illustrate, respectively, centralized and decentralized P2P (peer-to-peer) service provision to user devices.
Figure 2A:
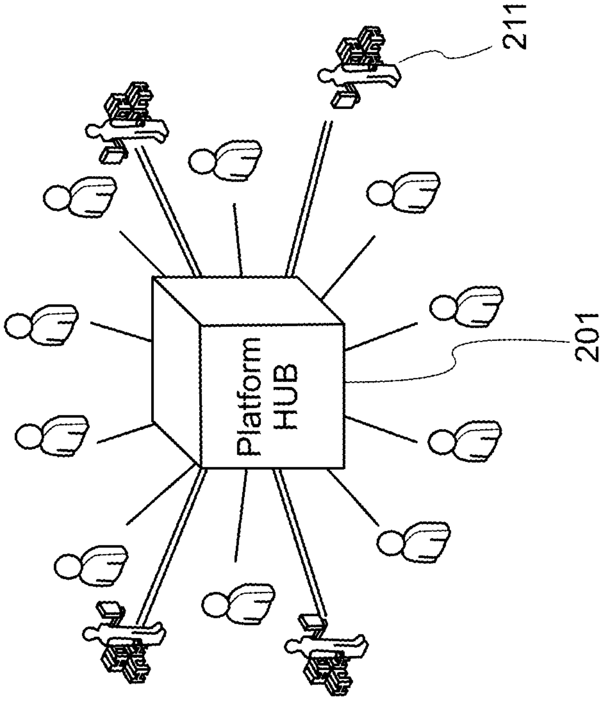

FIGS. 2A-B illustrate, respectively, the hub and spoke model and the peer-to-peer model of online communication and transaction. A hub, such as a content platform, is a focal point for nodes 211 to download content or other data or to obtain other information or services. A media industry example of a hub and spoke model of content distribution is Netflix, which serves customers by transmitting content acquired from producers, as well as creating content. In a decentralized P2P distributed service, as shown in FIG. 2B nodes 211 of a data network may be content producers may be content suppliers manifesting themselves as nodes in the decentralized P2P network. Other nodes 211 may be user devices may be content distributors, others still content consumers (users), but various users may assume more than one role at different times or at the same time.

Figure 3:
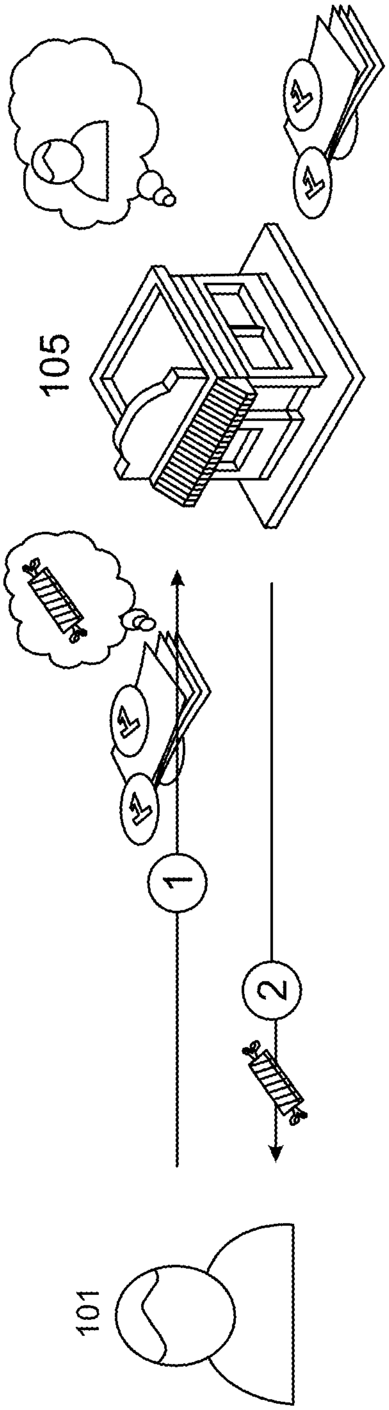
FIG. 3 illustrates a transaction between a user device and a server of a vendor.

FIG. 3 illustrates an approach to an online transaction, in which the identity of the UD 101 gets disclosed to the CD

105, and the product or data that is the target of the transaction may be associated with the UD's identity.

In step 1 of FIG. 3, the UD 101 purchases a product from the CD. The CD receives payment and in communication 2 sends the data or service to the UD 101. However, this, as a side effect, also allows the CD's device to associate the profile associated with the UD 101 to a certain product brand, which is called user profiling. When the UD 101 returns to buy other data through the server of the vendor, services or other products, this allows the CD to learn even more about people associated with the UD 101. FIG. 3 is illustrative of the privacy concerns that are present in content transactions and payments using other known systems.

Figure 4:
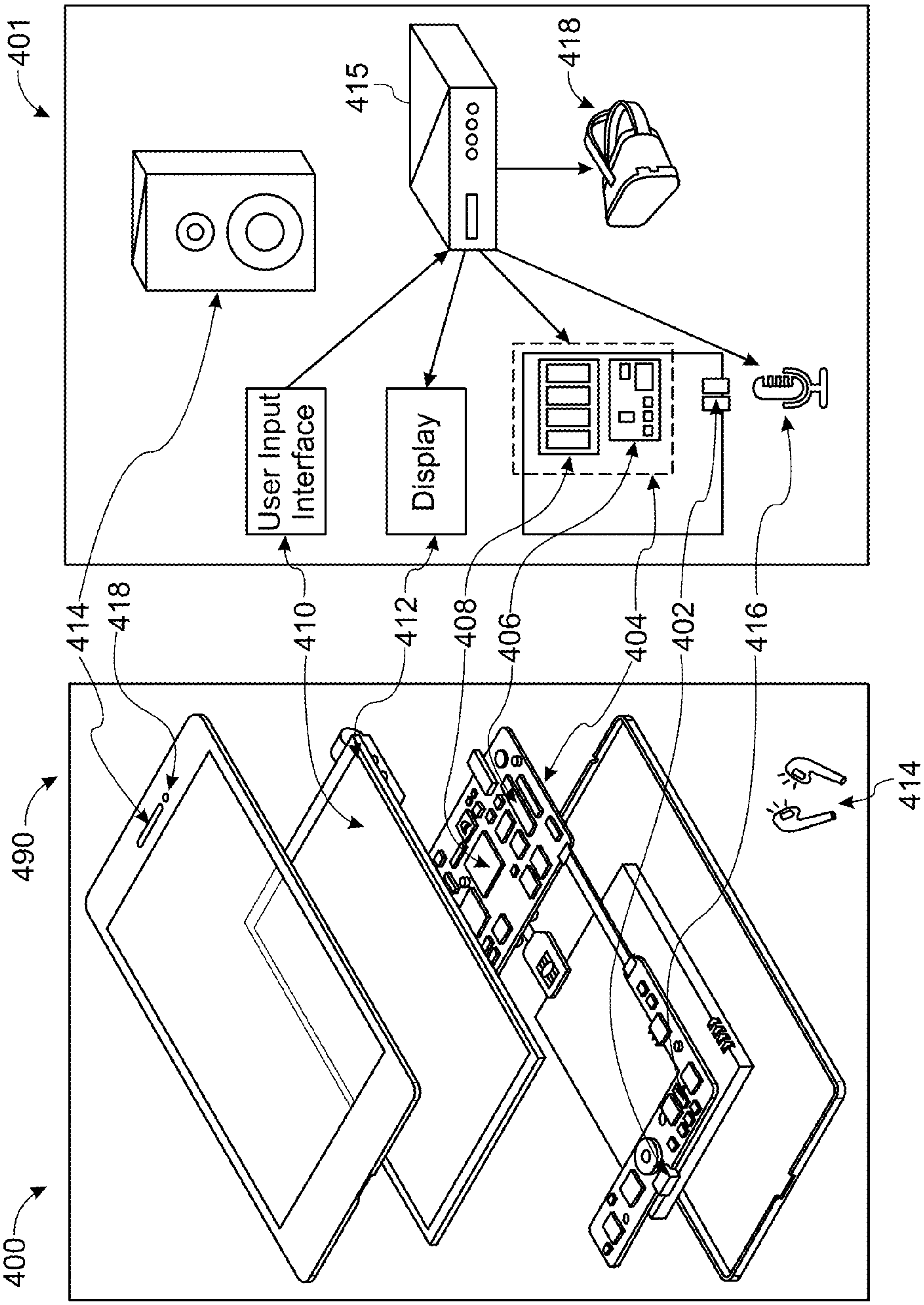
FIG. 4 is a block diagram illustrating an example of equipment that may be used at one or more nodes or actors in accordance with an aspect of the disclosure.

FIG. 4 describes illustrative devices, systems, servers, and related hardware for the systems and methods described herein. FIG. 4 illustrates generalized embodiments of user equipment 400, described by way of example as a handheld device, such as a cellphone, but which may be implemented as other user equipment described herein. For example, user equipment 400 may be a tablet, a virtual reality or augmented reality device, or any other suitable device capable of processing video data. While described as "user equipment," similar equipment, or a set or rack of such equipment, for example, one or more racks of servers in one or more server farms, may be used by other actors of the system, including the IS 103, the CD 105, the CS 106 and/or the PS 107.

UD 400 may comprise, or may be communicatively connected to structures shown in FIG. 4, including, microphone 416, audio output equipment (e.g., speaker or headphones 414), and/or display 412. In some embodiments, display 412 may be a television display or a computer display. In some embodiments, the circuit boards may include control circuitry, processing circuitry, and storage (e.g., RAM, ROM, hard disk, removable disk, etc.). In some embodiments, the circuit boards may include an input/output path.

Each user equipment device may receive content and data via input/output (I/O) path 402 that may comprise I/O circuitry (e.g., network card, or wireless transceiver). I/O path 402 of user equipment 400 may provide content (e.g., broadcast programming, on-demand programming, Internet content, content available over a local area network (LAN) or wide area network (WAN), and/or other content) and data to control circuitry 404, which may comprise processing circuitry 406 and storage 408. Control circuitry 404 of user equipment 400 may comprise processing circuitry 406, and may be used to send and receive commands, requests, and other suitable data using I/O path 402, which may comprise I/O circuitry. I/O path 402 may connect control circuitry 404 (and specifically processing circuitry 406) to one or more communications paths (described below). I/O functions may be provided by one or more of these communications paths, but are shown as a single path in FIG. 4 to avoid overcomplicating the drawing. The components of the device 400 working in concert may sometimes be referred to as the system.

Control circuitry 404 may be based on any suitable control circuitry such as processing circuitry 406. As referred to herein, control circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry may be distributed across multiple separate processors or processing units, for example, multiple of the same type of processing units (e.g., two Intel Core i9 processors) or multiple different processors (e.g., an Intel Core i7 processor and an Intel Core i9 processor). In some embodiments, control circuitry 404 executes instructions for stored in memory (e.g., storage 408). Specifically, control circuitry 404 may be instructed by an application to perform the functions discussed herein. In some implementations, processing or actions performed by control circuitry 404 may be based on instructions received from an application associated with one or more of the content providers 101 and/or 111.

In client/server-based embodiments, control circuitry 404 may include communications circuitry suitable for communicating with a server or other networks or servers, including with the content providers 101 and/or 111, and/or with devices of other actors shown in FIG. 1. The application associated with such communication or transaction may be implemented as software or a set of executable instructions. The instructions for performing any of the embodiments discussed herein of the application associated with one or more of the processes described herein may be encoded on non-transitory computer-readable media (e.g., a hard drive, random-access memory on a DRAM integrated circuit, read-only memory on a BLU-RAY disk, etc.). For example, in FIG. 4, the instructions may be stored in storage 408, and executed by control circuitry 404 of a device 400.

In some embodiments, such an application may be a client/server application where only the client application resides on device 400 (e.g., device 104), and a server application resides on an external server (e.g., server 101 and/or server 111). In a cloud computing environment, various types of computing services for performing communication and transactions, record keeping, billing, and the like on the internet or informational databases, providing applications associated with one or more of the providing storage (e.g., for a database) or parsing data (e.g., using machine learning algorithms described above and below) are provided by a collection of network-accessible computing and storage resources. Device 400 may be a cloud client or cloud server that relies on the cloud computing capabilities to determine whether processing (e.g., at least a portion of virtual background processing and/or at least a portion of other processing tasks) should be offloaded from the mobile device, and facilitate such offloading.

Communications circuitry may include a cable modem, an integrated services digital network (ISDN) modem, a digital subscriber line (DSL) modem, Wi-Fi or wired connection, a telephone modem, Ethernet card, or a wireless modem for communications with other equipment, or any other suitable communications circuitry.

Memory may be an electronic storage device provided as storage 408 that is part of control circuitry 404. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 408 may be used to store various types of content described herein as well as application associated with one or more of the content providers 101 and/or 111 data described above. Nonvolatile memory may also be used (e.g., to launch a boot-up routine and other instructions). Cloud-based storage, described in relation to FIG. 4, may be used to supplement storage 408 or instead of storage 408.

Control circuitry 404 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 404 may also include scaler circuitry for upconverting and down converting content into the preferred output format of user equipment 400. Control circuitry 404 may also include digital-to-analog converter circuitry and analog-to-digital converter circuitry for converting between digital and analog signals. The tuning and encoding circuitry may be used by user equipment device 400 to receive and to display, to play, or to record content. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 408 is provided as a separate device from user equipment device 400, the tuning and encoding circuitry (including multiple tuners) may be associated with storage 408.

Control circuitry 404 may receive instruction from a user by way of user input interface 410. UD 101 may include or be connected to input interface 410, which may be any suitable user interface, such as a remote control, mouse, trackball, keypad, keyboard, touch screen, touchpad, stylus input, joystick, voice recognition interface, or other user input interfaces. Display 412 may be provided as a stand-alone device or integrated with other elements of each one of user equipment device 400 and user equipment device 401. For example, display 412 may be a touchscreen or touch-sensitive display. In such circumstances, user input interface 410 may be integrated with or combined with display 412. In some embodiments, user input interface 410 includes a remote-control device having one or more microphones, buttons, keypads, any other components configured to receive user input or combinations thereof. For example, user input interface 410 may include a handheld remote-control device having an alphanumeric keypad and option buttons. In a further example, user input interface 410 may include a handheld remote-control device having a microphone and control circuitry configured to receive and identify voice commands and transmit information to set-top box 715.

Audio output equipment 414 may be integrated with or combined with display 412. Display 412 may be one or more of a monitor, a television, a liquid crystal display (LCD) for a mobile device, amorphous silicon display, low-temperature polysilicon display, electronic ink display, electrophoretic display, active matrix display, electro-wetting display, electro-fluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. A video card or graphics card may generate the output to the display 412. Audio output equipment 414 may be provided as integrated with other elements of each one of device 400 and equipment 401 or may be stand-alone units. An audio component of videos and other content displayed on display 412 may be played through speakers (or headphones) of audio output equipment 414. In some embodiments, audio may be distributed to a receiver (not shown), which processes and outputs the audio via speakers of audio output equipment 414. In some embodiments, for example, control circuitry 404 is configured to provide audio cues to a user, or other audio feedback to a user, using speakers of audio output equipment 414. There may be a separate microphone 416 or audio output equipment 414 may include a microphone configured to receive audio input such as voice commands or speech. For example, a user may speak letters or words that are received by the microphone and converted to text by control circuitry 404. In a further example, a user may voice commands that are received by a microphone and recognized by control circuitry 404.

The application(s) associated with one or more of the equipment of the UD 101, the IS 103, the CD 105, the CS 106 and the PS 107 may be implemented using any suitable architecture. For example, it may be a stand-alone application wholly implemented on each one of user equipment device 400 and user equipment device 401. In such an approach, instructions of the application may be stored locally (e.g., in storage 408), and data for use by the application is downloaded on a periodic basis (e.g., from an out-of-band feed, from an Internet resource, or using another suitable approach). Computer-readable media includes any media capable of storing data. The computer-readable media may be non-transitory including, but not limited to, volatile and non-volatile computer memory or storage devices such as a hard disk, floppy disk, USB drive, DVD, CD, media card, register memory, processor cache, Random Access Memory (RAM), etc.

In some embodiments, the application(s) associated with one or more of the UD 101, the IS 103, the CD 105, the CS 106 and the PS 107 may be downloaded and interpreted or otherwise run by an interpreter or virtual machine (run by control circuitry 404). In some embodiments, the application(s) may be encoded in the ETV Binary Interchange Format (EBIF), received by control circuitry 404 as part of a suitable feed, and interpreted by a user agent running on control circuitry 404. In some embodiments, the application(s) may be defined by a series of JAVA-based files that are received and run by a local virtual machine or other suitable middleware executed by control circuitry 404. In some of such embodiments (e.g., those employing MPEG-2 or other digital media encoding schemes), application(s) may be, for example, encoded and transmitted in an MPEG-2 object carousel with the MPEG audio and video packets of a program. The UD 101 and its associated equipment, and the equipment of the IS 103, the CD 105, the CS 106 and the PS 107 described with reference to this and other figures, may be coupled to a communication network, which may be one or more networks including the Internet, a mobile phone network, mobile voice or data network (e.g., a 5G, 4G, or LTE network), cable network, public switched telephone network, or other types of communication network or combinations of communication networks. Paths may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths.

Although not all communications paths are drawn between user equipment devices, these devices may communicate directly with each other via communications paths as well as other short-range, point-to-point communications paths, such as USB cables, IEEE 1394 cables, wireless paths (e.g., Bluetooth, infrared, IEEE 702-11x, etc.), or other short-range communication via wired or wireless paths. The user equipment devices may also communicate with each other directly through an indirect path via communication network.

As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television.

FIGS. 5A-5D illustrate examples of the cryptographic means that may be used as part of the privacy-preserving transaction for secure communication between actors and also may be used for digital signatures used for transmitting documents or other information. The public key infrastructure may be used to obtain a private key and a public key by various actors of the system.

Figure 5A:
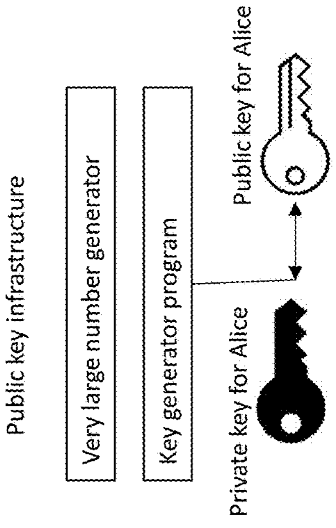
FIGS. 5A-5D show examples of public key-private key encryption and digital signature authentication.

As shown in FIG. 5A, in the public key-private key scheme, a large random number generator is used to a number, which is used to generate a pair of keys: a private key and a public key. The private key is known only to the actor to whom it belongs while the public key is published and may become known by anyone. Each party's device has a private key and one or more public keys for communicating with other nodes.

Figure 5B:
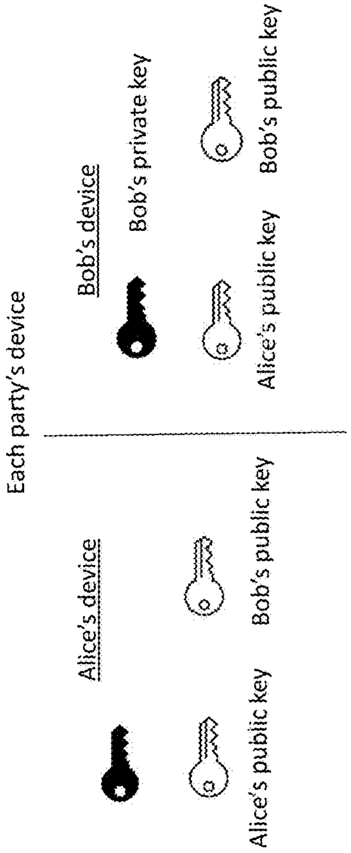

As shown in FIG. 5B, Alice's device has a private key known only to Alice and also has one or more public keys that are stored or obtained as needed, which are used to communicate securely with Bob and other nodes. Similarly, Bob's device has a private key known only to Bob and one or more public keys for Alice as well as other public keys for other nodes. Public keys of other nodes may be obtained by each node from the public-private key infrastructure.

Figure 5C:
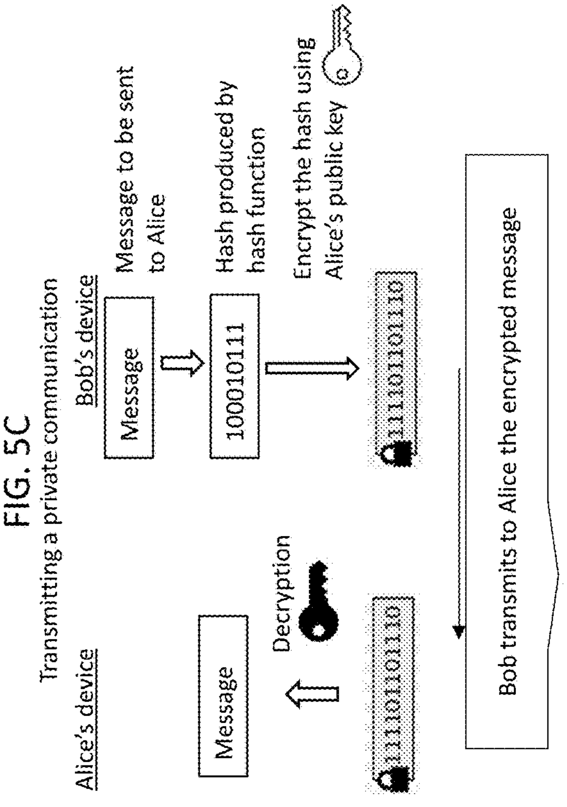

As shown in FIG. 5C, Bob may send Alice a private message by first encrypting a hash of the intended message using the public key of Alice. Alice received the encrypted message and uses her private key to decrypt the message that was encrypted using Alice's corresponding public key. Thus, if the message is intercepted, it may be decrypted only using Alice's private key.

Figure 5D:
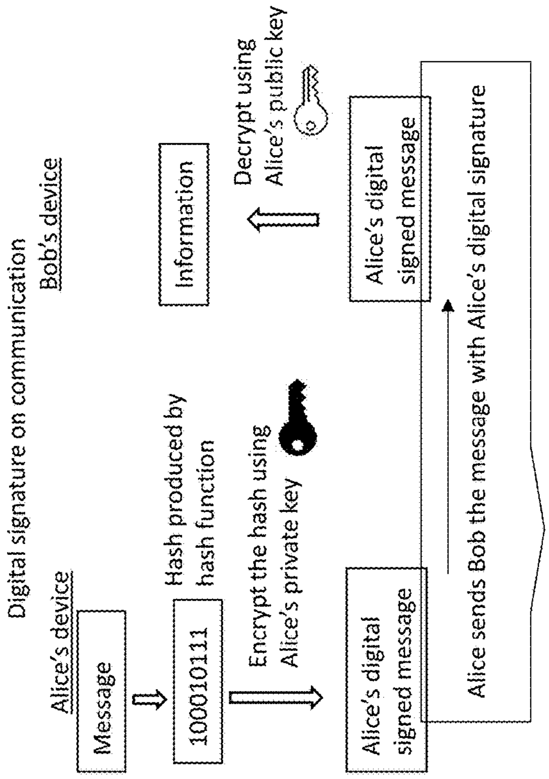

FIG. 5D shows that the private key-public key system may also be used for digital signatures for documents. For example, Alice may send Bob a message by first using Alice's private key to sign the message. Such a message would be guaranteed to have come from Alice because only Alice has Alice's private key. Alice's public key would be needed to decrypt the message. Anyone can obtain Alice's public key and may decrypt the message using Alice's public key. However, the receiving party would have some assurance that the message was from Alice because of the use of Alice's digital signature for the message provided using Alice's private key.

A transaction process will now be described with reference to FIG. 6. Each node, including the UD 101, the IS 103, the CD 105, the CS 106 and the PS 107, may include one or more devices including control circuitry 404, which may include communication circuitry, processing circuitry 406, and memory, as described with respect to FIG. 4. Communication circuitry may handle input/output with other nodes of the system via communications network. Aspects of the method 600 (shown in FIG. 6) for each of the actors of the transaction may be implemented, in whole or in part, by a system 490 shown in FIG. 4. One or more actions of the method 600 may be incorporated into or combined with one or more actions of any other process or embodiments described herein. The method 600 may be provided by one or more applications saved to a memory or storage as one or more instructions or routines, which may be executed by any suitable device or system having access to the memory or storage to implement the method 600. The computer readable media may be transitory, including, but not limited to, propagating electrical or electromagnetic signals, or may be non-transitory including, but not limited to, volatile and non-volatile computer memory or storage device, solid state device, hard drive, optical drive, a hard disk, floppy disk, USB drive, DVD, CD, media cards, register memory, processor caches, Random Access Memory ("RAM"), etc. Hardware implementations of these processes and implementations combining hardware and software are also contemplated.

In client-server based embodiments, control circuitry may include communications circuitry suitable for communicating with application server or other networks or servers. The instructions for carrying out the above mentioned functionality may be stored on the application server. Communications circuitry may include a cable modem, an integrated services digital network (ISDN) modem, a digital subscriber line (DSL) modem, Ethernet card, or a wireless modem for communications with other equipment, or any other suitable communications circuitry. Such communications may involve the Internet or any other suitable communications networks or paths. In addition, communications circuitry may include circuitry that enables peer-to-peer communication of user equipment devices, or communication of user equipment devices in locations remote from each other.

Control circuitry may include scaler circuitry for upconverting and down converting content into the preferred output format of the user equipment. The circuitry described herein, including for example, the tuning, video generating, encoding, decoding, encrypting, decrypting, scaler, and analog/digital circuitry, may be implemented using software running on one or more general purpose or specialized processors.

Figure 6:
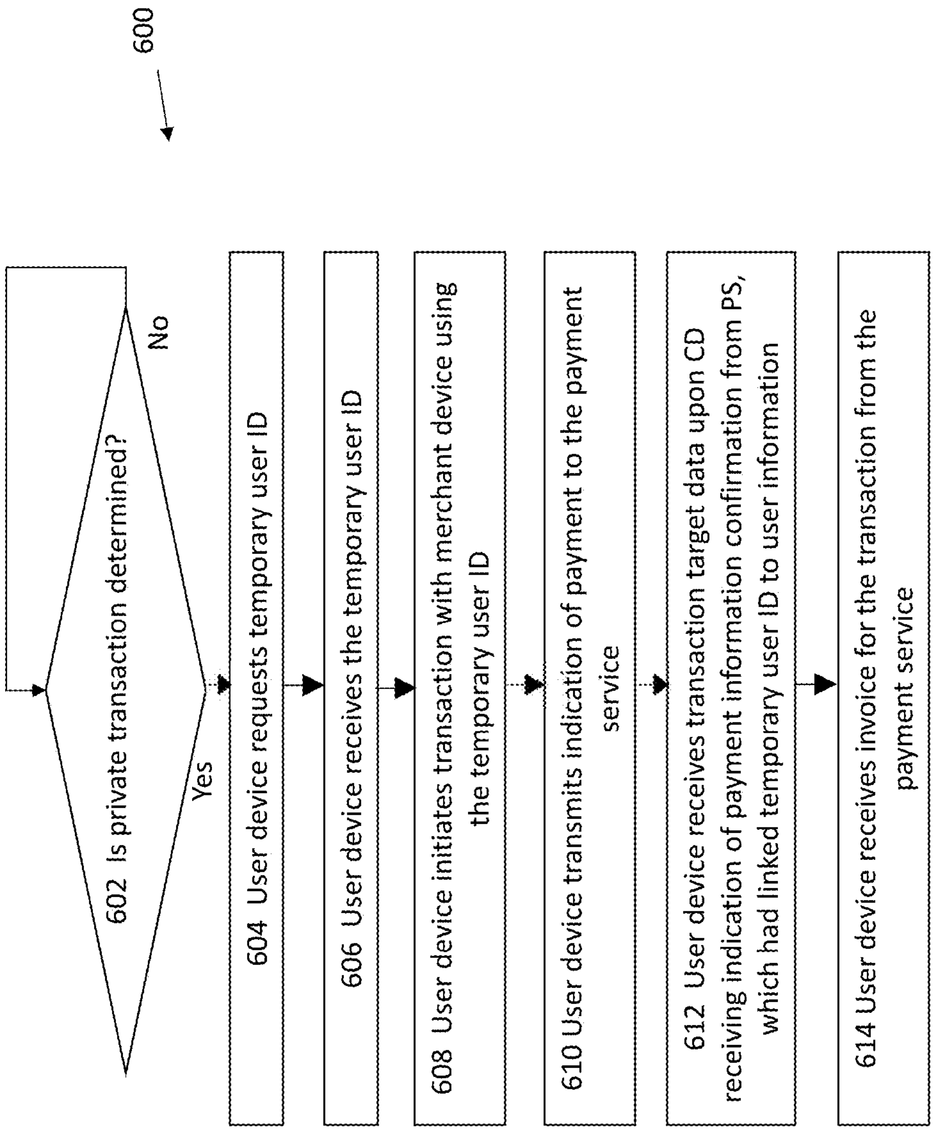
FIG. 6 illustrates a process that may be used for a transaction or for accessing media content, according to an aspect of the disclosure.

At 602 of FIG. 6, control circuitry (e.g., control circuitry 404, for example of the UD 101) may determine that the transaction is to be a billing privacy preserving transaction. For example, a human associated with the UD 101 may indicate that the transaction is to be private in this way. For example, the user may use an application for this purpose that resides or is run at the UD 101 or may use an application for this purpose that is run or resides on the cloud. Or, the system may automatically determine that the transaction requested to the UD 101 is to be a billing privacy preserving transaction based on the nature of the transaction, the content data sought in the transaction, based on previous transactions by UD 101 with the CD 105, or based on previous transactions of UD 101 for this type or for a similar type of product, or the like.

At 604, I/O circuitry of the User 101 transmits a request for a temporary user ID from the identity service (IS) 103, as shown by way of example at message 1 of FIG. 1 and transmission 701 of FIG. 7. This request may be initiated automatically by processing circuitry of the UD 101 in view of the fact that a billing privacy preserving transaction has been determined. As discussed, the UD 101 may also transmit to IS 103 payment information for user profiles associated with the User 101.

At 606, the I/O circuitry of UD 101 receives the temporary user ID requested from IS 103, as shown by way of example at message 2 of FIG. 1 and transmission 703 of FIG. 7. The temporary user ID would be digitally signed, for example, using the private key of IS 103. In addition, at 606 the UD 101 may also receive the payment information for the user also digitally signed by IS 103. For example, a private key of the IS may be used to provide a digital signature of the IS 103. The payment information may take one or more of the forms mentioned herein, including credit/debit card information, bank account information, bank wire payment information, Paypal or other internet service payment information, or the like. At this point, the UD 101 may encrypt using the public key of the PS 107 the payment information for the user that has been digitally signed by the IS 103. This encryption process may be initiated automatically when such a privacy-preserving transaction has been earlier commenced. Or, at 606, the UD 101 may receive the payment information for the user digitally signed by the IS 103 already encrypted using the public key of the PS 107.

At 608, the UD 101 initiates the transaction with the CD 105 using the temporary user ID received from the IS 103, as shown by way of example at message 1 of FIG. 3 and transmission 705 of FIG. 7. According to an aspect of the disclosure, the initiation of the transaction may be a separate step initiated by the user or by the UD 101 pursuant to which the UD 101 receives an instruction to initiate the transaction. According to another embodiment, the initiation of the transaction with the CD 103 is performed automatically by the UD 101 upon receipt of the temporary user ID from IS 103. In addition, as part of the initiation of the transaction, the UD 101 may also communicate to CD 105 the payment information for the user that has been digitally signed by the IS 103 and which is digitally encrypted using the public key of PS 107. According to an embodiment, one or more pieces of information, for example, the user's temporary ID, the encrypted user payment information, may be transmitted by the IS to the PS 107, or PS 107 may obtain this information from UD 101.

CD 105 may perform a number of steps to execute the transaction. Some or all of these steps may be performed by CD 105 automatically. CD 105 may contact PS 107 to request payment for the transaction, as shown by way of example at message 4 of FIG. 1 and transmission 711 of FIG. 7. In doing so, CD 105 may transmit to payment service 107 the temporary user ID with digital signature of the IS 103, may forward to PS 107 the payment information of the IS 103 with the digital signature of the IS 103 and encrypted using the public key of the PS 107. In response, PS 107 may decrypt the payment information for the user and determine the identifying information of the UD 101 or user profiles or people associated therewith. The digital signature of the IS 103 on the temporary ID of the UD 101 may assure the PS 107 that the user did in fact initiate the transaction and thus provide a measure of protection against an unscrupulous CD 105. According to an embodiment, the temporary ID of the UD 101 or of one or more users or of user profiles associated therewith may be encrypted by IS 103 using the private key of the IS 103, and this communication may be decrypted by any node using a public key of the IS 103. This would assure that the temporary ID signed by the IS was actually transmitted by the IS 103.

PS 107 may then process the transaction payment depending on the payment information that was received in encrypted form. PS 107 may contact the UD 101 to request payment and to provide an invoice for the transaction, as shown by way of example at message 7 of FIG. 1 and transmission 715 of FIG. 7. PS 107 may receive payment from the UD 101.

At 610, the UD 101 transmits payment to the PS 107, as shown by way of example at message 8 of FIG. 1. The payment may take one or more of many forms. Or, the UD may transmit an indication of payment to the PS 107. For example, the indication of payment may include confirmation that payment has been made or will be made to PS 107, or that sufficient funds remain in the user's account, or that a wire transfer has been made or has been processed or commenced, or the like. For example, PS 107 may charge a credit card of the user 101 and be informed that the credit card transaction has been approved or processed. PS 107 may them inform the CD 105 of confirmation of payment or indication of payment, as shown by way of example at message 5 of FIG. 1. For example, PS 107 may charge a credit card of the user 101 and be informed that the credit card transaction has been approved or processed. In response, PS 107 may inform CD105 of this event. In addition, PS 107 at this point may initiate payment to CD 105 using any of the foregoing means. According to an embodiment, PS 107 may transmit an indication of payment to the CD 105, or make a payment to CD 105 before receiving payment or indication of payment from the UD 101. For example, the UD 101 may have an account, for example, an account with a positive cash balance, or may have a credit, with the PS 107, and thus PS 107 may pay or transmit indication of payment to CD 107 before, or contemporaneous with, receiving payment or indication of payment at 610 from the UD 101. In an embodiment, PS 107 need not make a payment to CD 105 before the CD 105 releases the data or product to the UD 101. For example, the CD 105 may have an account with PS 107, or PS 107 may have credit with the PS 107, and thus have confidence that PS 107 will eventually pay or that PS 107 will make payment to CD 105 contemporaneous with fulfillment of the transaction by the CD 105.

At 612, the UD 101 receives the content data or other data or the service or other product that is the target of the transaction, as shown by way of example at message 6 of FIG. 1 and transmission 713 of FIG. 7.

CD 105 may provide the data or service, or transmit the license to UD 101, or may arrange for CS 106 or another node to do so. Depending on the nature of the transaction, in response to receiving payment or indication of payment from the PS 107, the CD device 105 may initiate steps to fulfill the transaction by delivering the content data or other data, service or product that is the target of the transaction. For example, device 105 may transmit content data to the UD device 101 or may contact CS 106 to request content data delivery. According to an embodiment, CS 106 may transmit the content data to the UD 101. According to another embodiment, CS 106 may transmit the content data to the CD 105, which may then transmit content data to the UD 101. CD 105 may initiate the performance of services provided by one or more computer servers, for example, rendering a webpage, creating content, downloading software or other content, providing access to a database, generating content using an AI, creating a password, enrolling the UD 101 as a subscriber, creating a gift card, make payment on a bill, place an order, or the like, for the UD 101 in exchange for the payment or indication of payment received from PS 107. According to an embodiment, CD 105 may fulfill an order of a product, for example, by checking inventory in a warehouse and initiating shipping of the product, in exchange for the payment or indication of payment received from PS 107. The UD 101 may also receive a fuller report of the transaction from the CD 105, including the temporary username that was used and the name, brand, quantity of the content or other data, product or service provided.

At 614, the UD 101 may receive an invoice from the PS 107, as shown by way of example at message 7 of FIG. 1 and transmission 715 of FIG. 7. The invoice may specify the data/time of the transaction, the method of payment, including payer name and payer's details (or details of a device or network associated with UD 101), account number, amount of the transaction, fees and taxes associated with the transaction, service charges of the PS 107 and/or of the IS 103 in connection with the transaction, the temporary user ID associated with the transaction, and the like.

As shown in communication 717 of FIG. 7, the process may entail UD 101 transmitting payment, or provide proof or assurance or confirmation of payment, to PS 107. Before, during or after this step, at communication 719 PS 107 may transmit payment, or provide proof or assurance or confirmation of payment, to CS 105. In an embodiment, CS 105 provides the data or service to UD 101 after it has received payment or indication of payment from PS 101.

The process concludes and the process may be repeated for another transaction, such that the UD 101 may request and obtain an new temporary user ID (SOTI) from IS 103 and use the new temporary user ID for the new transaction with the same or different CD 105 and/or with the same or different PS 107. The SOTI may be randomized so that previous SOTIs, identifying information of users associated with the UD 101, or of devices or networks associated therewith, cannot be known therefrom. The steps outlined may be executed or performed in any order or sequence not limited to the order and sequence shown and described in the figures. Also, some of the above steps of the diagrams of FIGS. 1, 6, 7 and 8 may be executed or performed substantially simultaneously, where appropriate. For example, communication 713 may be performed after communication 719. In addition or instead, communication 717 may be performed before communication 713. One or more of the payment/indications of payment steps may be performed via another payment intermediary, such as a credit card, debit card system or via a third party bank wiring system or via a bank payment clearinghouse system.

FIG. 7 illustrates an example of communication that may be performed between various actors of the transaction. At 701 user device 101 requests a temporary ID to IS 103, as shown by way of illustrative example in Message 1 of FIG. 8.

At 703, IS 103 replies with the temporary user ID which may be digitally signed by IS 103. This is shown by way of illustrative example in Message 2 of FIG. 8.

At 705 user transmits transaction request, which may be a license for digital content to CD 105, as shown by way of illustrative example in Message 3 of FIG. 8. For example, in a transaction involving digital rights management (DRM), the license request may be a license for one or more of viewing, downloading, altering, distributing, performing digital content, such as a song or other film or other media asset.

As referred to herein, the terms "content item," "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

Pursuant to the license request, at 106 CD 105 may seek out the content, for example, from content supplier CS 106. At 707, CD 105 may request content from CS 106, as shown by way of illustrative example in Message 4 of FIG. 8. At 709, CS 107 may reply to the request to CD105, as shown by way of illustrative example in Message 5 of FIG. 8. In addition, CD 105 may make a payment or provide indication of payment to CS106 in exchange for the license and/or for the content.

At 711, CD 105 may request payment and invoice generation to PS 107, as shown by way of illustrative example in Message 6 of FIG. 8. PS 107 may then request payment from user 101 and they provide indication of payment to CD 105.

CD 105 may reply to the license request to user 101, as shown at 713, as shown by way of illustrative example in Message 7 of FIG. 8. The license reply at 713 may include content data or may merely provide a license to obtain the content data. The reply 713 may also include other information about the license or the content data, including the content supplier 106 identification, the scope of the license and its terms, the expiration of the license and the like.

At 715, user 101 receives an invoice from PS 107 detailing the transaction payment details, as shown by way of illustrative example in Message 8 of FIG. 8.

As shown in communication 717 of FIG. 7, the process may entail UD 101 transmitting payment, or provide proof or assurance or confirmation of payment, to PS 107. Before, during or after this step, at communication 719 PS 107 may transmit payment, or provide proof or assurance or confirmation of payment, to CS 105.

FIG. 8 illustrates example of contents of communications that may be transmitted between the nodes, actors, or participants in a P2P network, for example, over a data network, such as the Internet. Messages are described using a modified semiformal Alice & Bob notation, in which messages are described in curly brackets optionally followed by the key that is used to encrypt the message. Aspects of the public key and private key encryption/decryption schemes are shown in FIGS. 5A-D. The notation includes keys that include the name of the actor and type of the key. For example:

pk(A) is a public key of the actor A;

sk(B) is a private key of the actor B.

A message M encrypted by a public key of B is described as:

{M}pk(B).

The notation also allows an additional specifier to specify that the key pair is ephemeral key pair. For example, an ephemeral public key of the actor B is marked as: pk(Beph).

Message structure fields, e.g., (M1 and M2), are presented as a comma separated list: {M1, M2}. Messaging format may optionally support data structure envelope format like XML, JSON or even MIME. The character '#' is used to specify cryptographic hash algorithm. Concatenation of messages M1 and M2 use notation {M1||M2}. A message M signed by the actor A, may be shown as:

{M}{#M}sk(A)

However, it may also use the following notation:

Signed{M}sk(A)

As shown in FIG. 8, the UD 101 may first create or obtain an ephemeral asymmetric cryptography key pair, as shown in FIG. 5A. Referring to the illustrative message 1, the UD 101 may first create an ephemeral asymmetric cryptographic key pair $U_{eph}$. In an embodiment, the ephemeral asymmetric cryptographic key pair $U_{eph}$ may be used by the UD and only for a single transaction. The UD 101 may transmit a Signed One-Time Identifier (SOTI) request to the IS 103. As part of that request, UD 101 may transmit:

- user and/or device authentication information (auth-info), which may include username and password and/or may, by way of example, make use of the OAuth 2 authorization framework to enable the IS 103 to obtain limited access to a user account associated with the UD 101 for performing user and/or device authentication.
- payment information (invoice-address), which may specify a means of payment by the user associated with the UD 101 and may include other payment details for the user. And
- the public key part of the generated key pair pk($U_{eph}$). The UD 101, upon eventually receiving back the pair pk($U_{eph}$), may use the private key of the UD 101 to decrypt the $U_{eph}$, thus confirming for the UD 101 that the UD 101 was the originator of the request for the transaction, including the content that it receives from the CD 105 is responsive to that original request of the UD 101. An example of such a message is shown as Message 1 in FIG. 8.

The IS 103 may confirm the authentication information and, if authentication is successful, the service may create a One-Time Identifier (OTI) for the user, which may be a random value, such as a cryptographic nonce. The OTI is signed by the IS 103 to create a Signed One-Time Identifier (SOTI). The IS 103 may also digitally sign the ephemeral public key to create pk($U_{eph}$)sk(IS), and also digitally sign the invoice address, as shown in FIG. 5D, and return to the UD 101 a message such as Message 2 in FIG. 8. In the example of Message 2, the IS 103 may use its secret key (sk(IS)) to sign the OTI, the ephemeral public key, and the invoice address. Thus, as shown in Message 2 of FIG. 8, the IS 103 may transmit to the UD 101, in response to the SOTI request of UD 101: pk($U_{eph}$)sk(IS), the payment information digitally signed by the IS 103, and the SOTI (the OTI signed by the IS 103 using its secret key).

The UD 101 may encrypt the payment information (invoice address) that had been digitally signed by the IS 103. The UD 101 may perform this encryption using a public key of the PS 107, for example, as shown using the public key encryption process of FIG. 5C. The US 101 may then transmit a license or transaction request for media content item that is identified by an identifier called ContentID to the CD 105, as shown by way of illustrative example in Message 3 of FIG. 8. The license request may also include the SOTI, and the signed ephemeral public key. In addition, the transmission by the UD 101 to the CD 105 may also include the signed payment information (invoice address) that is encrypted by a public key of the PS 107.

In response, the CD 105 may take care of license management. According to an aspect of the disclosure, a Content Encryption Key (CEK) for a media item may be managed by the Content Supplier 106. The CEK may enable the UD 101 to access the content that is the object of the transaction, for example, by accessing the CD 106 after payments are concluded. The CD 105 may send a request for CEK to the Content Supplier 106, as shown by way of illustration in Message 4 of FIG. 8.

In reply, as shown in Message 5, the CD 105 may receive from CS 106 a message that contains an encrypted CEK value, and may be signed using a secret key of the CS 106 to assure the CD 105 that it is from the CS 106. In an embodiment, the CD 105 cannot decrypt this message, because it is encrypted by the ephemeral key of the user. According to this embodiment, in this way the CD 105 can pass along to the UD 101 the ability to access the content, but the CD cannot neither access the content itself nor enable others to do so.

When the CD 105 receives the encrypted CEK, as shown by way of example in Message 6, CD 105 may send an invoice message to a PS 107 containing the amount of payment, the license identifier, the signed ephemeral key of the UD, and the encrypted invoice.

At Message 7 the CD 105 may then send the license information, including the encrypted CEK, to the UD 101 together with a report that contains other information. Message 7 may include: the CEK, which may be encrypted using the ephemeral key—pk($U_{eph}$) of the UD 101; and a license ID for the product to be transmitted to the UD 101. Encryption using the pk($U_{eph}$) may prevent tampering by the CD 105 with the content/license for the content that it receives from another source, such as from the CS 106, and may assure the UD 101 that the content/license for the content received is responsive to the original request of the UD 101 pursuant to the transaction initiated. The UD 101 may decrypt the encrypted CEK using the private key of the UD 101. The CD 105 may also transmit to the UD 101 a verification message detailing other aspect of the content, license and/or transaction.

The PS 107 may then send the invoice to the UD 101, as shown in Message 8. The invoice may include the amount of the transaction being billed and the license ID digitally signed by the PS 107 using the secret key of the PS 107 to assure the UD 101 of the source of the transmission (the source is the PS 107) and thus to assure the UD 101 of the association between the amount due and the license/transaction.

Figure 9A:
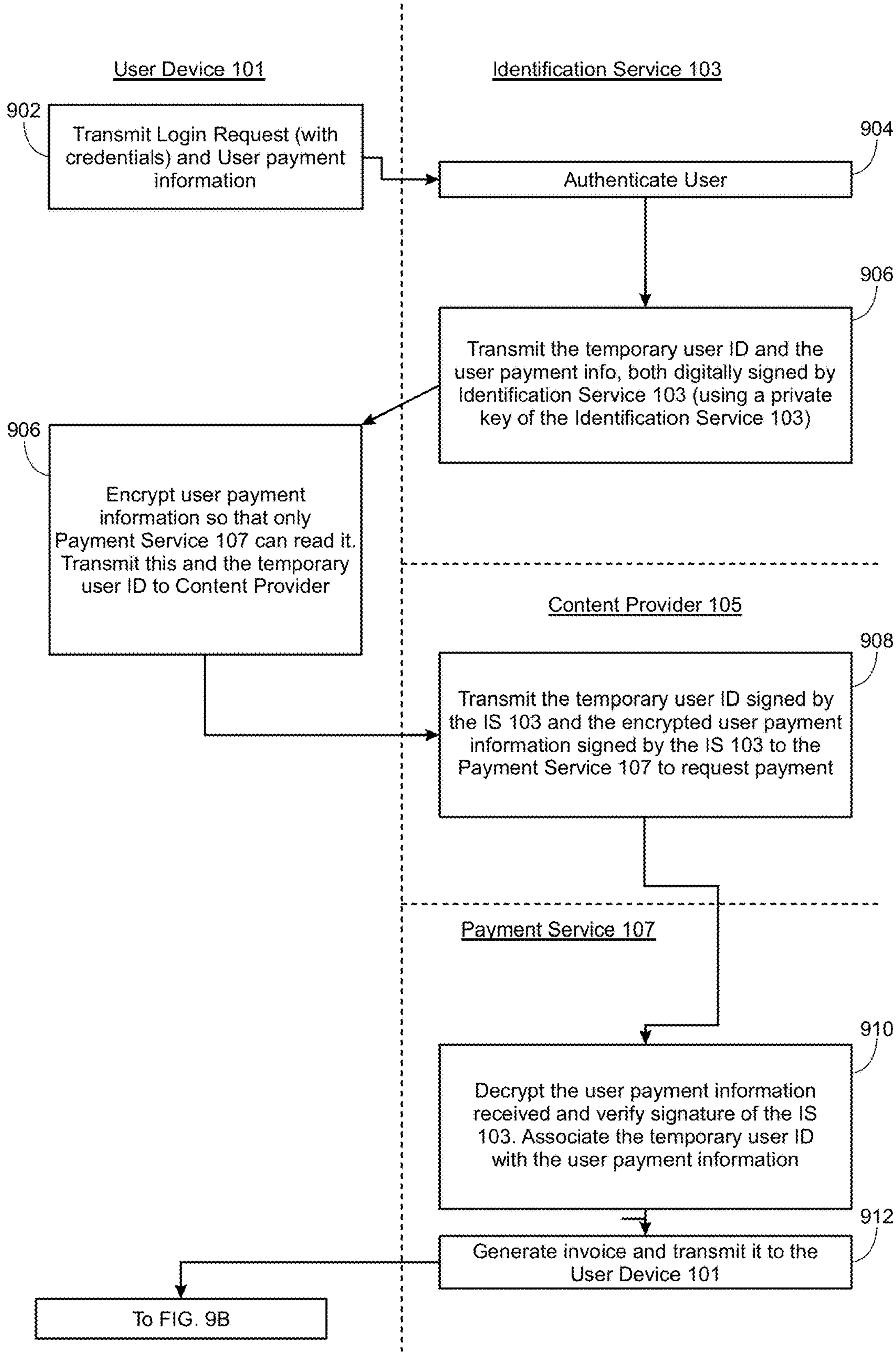
FIGS. 9A-9B are communication flow diagrams between actors of the online billing privacy-preserving transaction showing steps performed by the actors, according to an aspect of the disclosure.
Figure 9B:
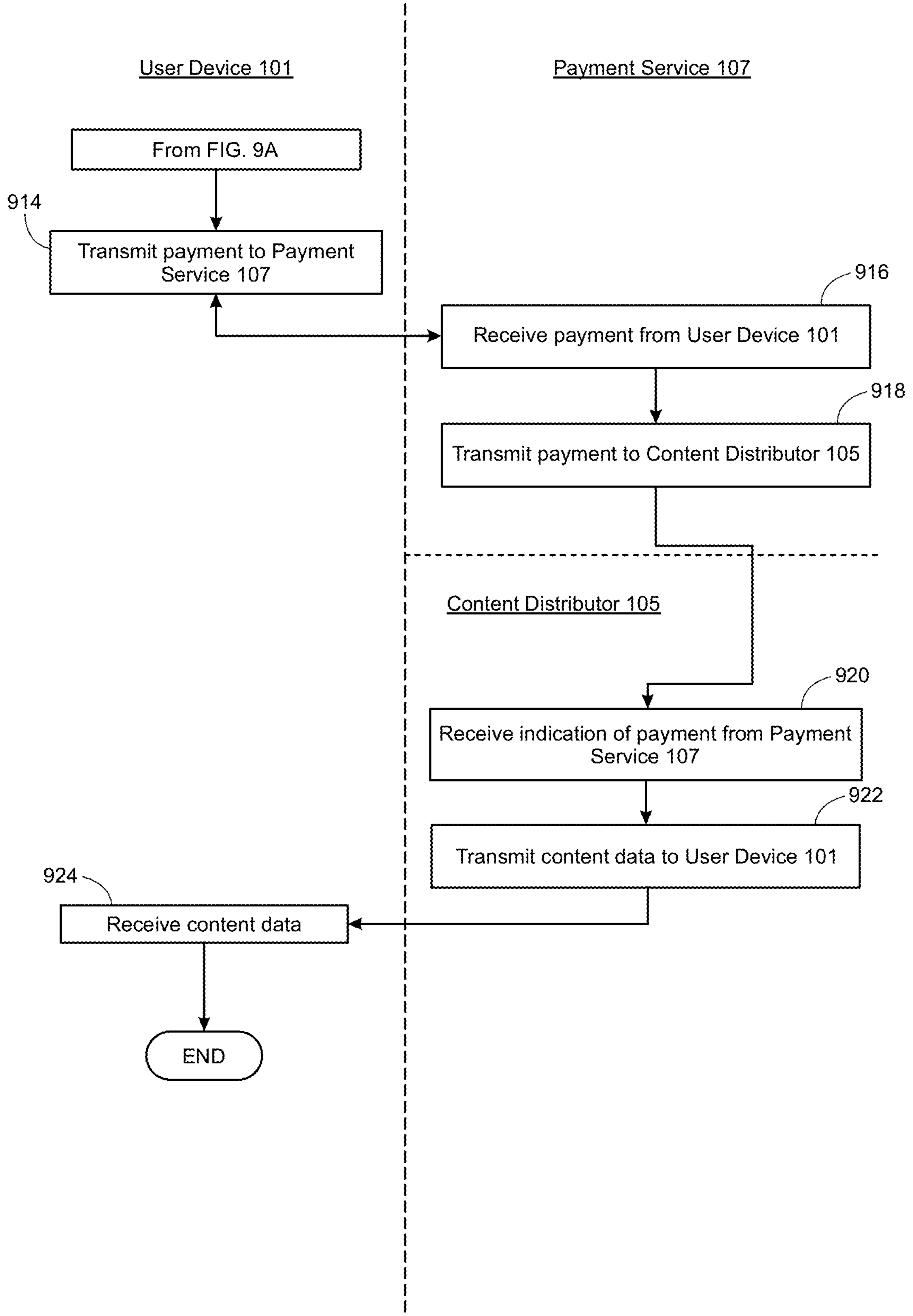

FIGS. 9A-9B is a communication flow diagram showing processing performed by various nodes, shown on the right hand side of FIGS. 9A-9B, and the UD 101 shown on the left hand side. At 902, the UD 101 transmits a login request to the Identification service 103. The transmission may also include payment information, for example user credit card or bank information, associated with a user profile in the User device 101.

At 904, the Identification service 103 receives the transmission from the UD 101 and authenticates user 904 using user credentials. The IS 103 may generate a temporary user ID (SOTI) for the user to be used for this transaction, and may transmit this temporary user ID and the user payment information, both of which may be digitally signed by IS 103, to the UD 101. As discussed above, the IS 103 may use its own private key to sign the temporary user ID and the user payment information, so that any party with a public key of the IS 103 may read this information and be assured that it is sent from the IS 103.

At 906, the UD 101, upon receiving this transmission from the IS 103, may encrypt the user payment information signed by the IS 103 to ensure that only the PS 101 can read it. For example, UD 101 may use a public key of the PS 107 to encrypt the user payment information. Once it is encrypted using the public key of the PS 107, this user payment information may be read only by decrypting the user payment information using the private key of the PS 107. The UD 101 transmits this encrypted user payment information, as signed by the IS 103, together with the temporary user ID also signed by IS 103, to the Content provider (CD) 105.

CD 105, upon receiving this transmission from the UD 101, at 908, transmits the temporary user ID signed by the IS 103, and the encrypted user payment information signed by the IS 103, to the PS 107. In this way, content provider 105 requests payment.

At 910, PS 107 decrypts, using its private key, the user payment information that had been encrypted by the UD 101. The PS 107 associates the temporary user ID for user device 101 with the user payment information that it has decrypted. At 912, the PS 107 generates an invoice and transmits it to the UD 101.

Turning to FIG. 9B, at 914, the UD 101 transmits payment to the PS 107. Upon receiving indication of payment at 916, at 918 the PS 107 transmits payment to the CD 105. CD 105, upon receiving indication of payment at 920 from PS 107, at 922 transmits the content data that is the subject of the transaction to the UD 101. The UD 101 receives the content data at 924 and the process ends.

FIG. 10 illustrates an example of which devices communication over a network as shown in FIG. 7 have access to which user profile data, according to an aspect of the disclosure. For example, if a transaction, using a temporary user ID, to download content data to user device 101 is completed and payment and invoicing are also completed, then user identity may be known, in addition to the user device 101, only by the IS, IS 103.

The content data may be known, in addition to the user device, only by the CD 105 and the CS 106. The license data for the content data may be known, in addition to the user device, only by the CD, the CS and the PS 107. The payment transmitted by user device, as well as the invoice details, may be known only by the PS 107, in addition to the user device. The CEK, if relevant, may be known, in addition to the user device, only by the CS 106.

It will be understood, however, that according to other implementations, one or more additional nodes may learn of various aspects of user data. Accordingly, access to user profile data may be controlled, and online user privacy, including billing privacy, may be preserved or enhanced. According to an embodiment, an unscrupulous CD may not learn data of the user profile.

The term "and/or," may be understood to mean "either or both" of the elements thus indicated. Additional elements may optionally be present unless excluded by the context. Terms such as "first," "second," "third" in the claims referring to a structure, module or step should not necessarily be construed to mean precedence or temporal order but are generally intended to distinguish between claim elements.

The above-described embodiments are intended to be examples only. Components or processes described as separate may be combined or combined in ways other than as described, and components or processes described as being together or as integrated may be provided separately. Steps or processes described as being performed in a particular order may be re-ordered or recombined.

Features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time.

It should also be noted that the systems and/or methods described above may be applied to, or used in accordance with, other systems and/or methods. In various embodiments, additional elements may be included, some elements may be removed, and/or elements may be arranged differently from what is shown. Alterations, modifications and variations can be effected to the particular embodiments by those of skill in the art without departing from the scope of the present application, which is defined solely by the claims appended hereto.

What is claimed is:

1. A method comprising:

receiving, by a first computing device from a second computing device, a temporary user identifier encrypted using a private key of the second computing device and payment information encrypted using the private key of the second computing device, wherein the first computing device is associated with user information;

encrypting, by the first computing device using a public key of an authorizing computing device, the payment information that was encrypted using the private key of the second computing device;

initiating, by the first computing device, a transaction with a third computing device using the temporary user identifier that was encrypted using the private key of the second computing device; and receiving, by the first computing device, data from the third computing device, wherein the data is received from the third computing device based at least in part on the third computing device receiving a first indication of payment from the authorizing computing device;

wherein the first indication of payment from the authorizing computing device was received by the third computing device based at least in part on: the authorizing computing device receiving the temporary user identifier and linking the temporary user identifier to the user information based at least in part on the payment information that was encrypted using the private key of the second computing device as further encrypted by the first computing device, and the authorizing computing device receiving, based at least in part on the user information, a second indication of payment for the transaction.

2. The method of claim 1, further comprising:

receiving, by the first computing device from the authorizing computing device, an invoice message for the transaction, the invoice message based at least in part on the user information being linked, by the authorizing computing device, to the temporary user identifier.

3. The method of claim 1, further comprising:

receiving, by the first computing device, the user information encrypted by the second computing device;

encoding, by the first computing device using a public key of the authorizing computing device, the encrypted user information; and transmitting, by the first device to the third computing device, the encoded, encrypted user information;

wherein the temporary user identifier is linked, by the authorizing computing device, to the payment information based at least in part on the encoded, encrypted user information that is received by the authorizing computing device from the third device.

4. The method of claim 3, wherein the user information received by the first computing device is encrypted using the private key of the second computing device.

5. The method of claim 4, wherein the user information encrypted by the second computing device is encoded by the first computing device using the public key of the authorizing computing device.

6. A method comprising:

receiving, by a user device from an identification service device, a temporary identifier encrypted using a private key of the identification service device and payment information encrypted using the private key of the identification service device;

encrypting, by the user device using a public key of a payment service device, the payment information that was encrypted using the private key of the identification service device;

initiating, by the user device, a transaction with a content distributor device using the temporary identifier that was encrypted using the private key of the identification service device; and receiving, by the user device from the content distributor device, requested data transmitted based at least in part on the content distributor device receiving a first indication of payment for the transaction from a payment service device, wherein the first indication of payment for the transaction was transmitted by the payment service device based at least in part on:

the payment service device receiving the payment information that was encrypted using the private key of the identification service device as further encrypted by the user device and receiving the temporary identifier, and linking the temporary identifier to user information based at least in part on the received payment information; and the payment service device receiving a second indication of payment based at least in part on the user information.

7. The method of claim 6, wherein the initiating, by the user device, of the transaction with the content distributor device, further comprises:

the user device transmitting to the content distributor device the payment information that was encrypted by the identification service device, as encrypted by the user device using the public key of the payment service device.

8. The method of claim 6, wherein the initiating, by the user device, of the transaction with the content distributor device, further comprises the user device transmitting to the content distributor device:

the temporary identifier that was encrypted by the identification service device; and the payment information that was encrypted by the identification service device, as encrypted by the user device using the public key of the payment service device.

9. The method of claim 6, further comprising:

receiving, by the user device from the identification service device, a user public key that was encrypted by the identification service device;

wherein the initiating of the transaction with the content distributor device further comprises transmitting, by the user device to the content distributor device, the user public key that was encrypted by the identification service device; and wherein the receiving, by the user device from the content distributor device, the requested data further comprises receiving a media content item encoded by the user public key.

10. The method of claim 6, wherein the data received by the user device is media content data.

11. A system comprising:

communication circuitry of a first computing device configured to receive, from a second computing device, a temporary user identifier encrypted using a private key of the second computing device and payment information encrypted using the private key of the second computing device, wherein the first computing device is associated with user information; and processing circuitry of the first computing device configured:

to encrypt, using a public key of an authorizing computing device, the payment information that was encrypted using the private key of the second computing device;

wherein the system is configured:

to initiate a transaction with a third computing device using the temporary user identifier; and to receive data from the third computing device, wherein the data is received from the third computing device based at least in part on the third computing device receiving a first indication of payment from an authorizing computing device;

wherein the first indication of payment from the authorizing computing device was received by the third computing device based at least in part on: the authorizing computing device receiving the temporary user identifier and linking the temporary user identifier to the user information based at least in part on the payment information encrypted using the private key of the second computing device as further encrypted by the first computing device, and the authorizing computing device receiving, based at least in part on the user information, a second indication of payment for the transaction.

12. The system of claim 11, wherein the system is further configured:

to receive from the authorizing computing device an invoice message for the transaction, the invoice message based at least in part on the user information being linked, by the authorizing computing device, to the temporary user identifier.

13. The system of claim 11, wherein the system is further configured:

to receive the user information encrypted by the second computing device;

to encode using the public key of the authorizing computing device, the encrypted user information; and to transmit to the third computing device, the encoded, encrypted payment information;

wherein the temporary user identifier is linked, by the authorizing computing device, to the user information based at least in part on the encoded, encrypted payment information that is received by the authorizing computing device from the third computing device.

14. The system of claim 13, wherein the user information received by the first computing device is encrypted using a private key of the second device.

15. The system of claim 14, wherein the user information encrypted by the second computing device is encoded by the user device using a public key of the authorizing computing device.

16. A system comprising:

communication circuitry of a first user device configured:

to receive, from an identification service device, a temporary identifier encrypted by the identification service device and payment information encrypted by the identification service device; and processing circuitry of the first user device configured:

to encrypt using a public key of a payment service device, the payment information that was encrypted by the identification service device;

to initiate a transaction with a content distributor device using the temporary identifier; and to receive, from the content distributor device, requested data transmitted based at least in part on the content distributor device receiving a first indication of payment for the transaction from a payment service device, wherein the first indication of payment for the transaction was transmitted by the payment service device based at least in part on:

the payment service device receiving the temporary identifier and linking the temporary identifier to user information based at least in part on the payment information that was encrypted by the identification service device as further encrypted by the user device; and the payment service device receiving a second indication of payment based at least in part on the user information.

17. The system of claim 16, wherein in the initiating of the transaction with the content distributor device, the user device is further configured:

to transmit to the content distributor device the payment information encrypted by the identification service device, as encrypted by the user device using the public key of the payment service device.

18. The system of claim 16, wherein in the initiating of the transaction with the content distributor device, the user device is further configured to transmit to the content distributor device:

the temporary ID identifier encrypted by the identification service device; and the payment information encrypted by the identification service device, as encrypted by the user device using the public key of the payment service device.

19. The system of claim 16, wherein the system is further configured:

to receive, from the identification service device, a user public key encrypted by the identification service device, wherein the initiating of the transaction with the content distributor device further comprises transmitting, by the user device to the content distributor device, the user public key encrypted by the identification service device; and wherein the receiving, by the user device from the content distributor device, the requested data further comprises receiving a media content item encoded by the user public key.

20. The system of claim 16, wherein the data received by the user device is media content data.

* * * * *